US011283651B2

(12) United States Patent
Manolakos et al.

(10) Patent No.: US 11,283,651 B2
(45) Date of Patent: Mar. 22, 2022

(54) SOUNDING REFERENCE SIGNAL (SRS) RESOURCE AND RESOURCE SET CONFIGURATIONS FOR POSITIONING

(71) Applicant: QUALCOMM Incorporated, San Diego, CA (US)

(72) Inventors: Alexandros Manolakos, San Diego, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 16/783,129

(22) Filed: Feb. 5, 2020

(65) Prior Publication Data

US 2020/0259683 A1 Aug. 13, 2020

(30) Foreign Application Priority Data

Feb. 8, 2019 (GR) .............................. 20190100070

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 52/10* (2013.01);
(Continued)

(58) Field of Classification Search
CPC .................................................. H04L 25/0226
See application file for complete search history.

(56) References Cited

U.S. PATENT DOCUMENTS 9,252,934 B2 2/2016 Hwang et al.
2013/0083683 A1* 4/2013 Hwang ................. H04L 5/0053
370/252

(Continued)

FOREIGN PATENT DOCUMENTS

WO 2013141771 A1 9/2013

OTHER PUBLICATIONS

International Search Report and Written Opinion—PCT/US2020/017016—ISA/EPO—dated May 8, 2020.
(Continued)

*Primary Examiner* — Jason E Mattis
(74) *Attorney, Agent, or Firm* — Qualcomm Incorporated

(57) ABSTRACT

Disclosed are techniques for using sounding reference signal (SRS) for positioning. In an aspect, a UE receives an SRS configuration, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning. The UE transmits a positioning SRS utilizing one or more positioning SRS ports, wherein the positioning SRS is transmitted in a positioning SRS pattern such that across N consecutive symbols, where N is greater than or equal to two, SRS resource elements (REs) to which the one or more positioning SRS ports are mapped are staggered in frequency and use each of the N consecutive symbols.

80 Claims, 15 Drawing Sheets

(51) Int. Cl.
H04W 52/10 (2009.01)
H04W 72/04 (2009.01)
H04W 88/06 (2009.01)
H04W 88/10 (2009.01)

(52) U.S. Cl.
CPC ....... *H04W 72/0446* (2013.01); *H04W 88/06* (2013.01); *H04W 88/10* (2013.01)

(56) References Cited

U.S. PATENT DOCUMENTS

| | | | | |
|---|---|---|---|---|
| 2017/0288897 | A1* | 10/2017 | You | H04W 4/029 |
| 2018/0167895 | A1* | 6/2018 | Lee | H04W 52/24 |
| 2020/0053703 | A1* | 2/2020 | Akkarakaran | H04L 27/261 |
| 2020/0236641 | A1* | 7/2020 | Akkarakaran | H04B 1/1036 |
| 2021/0195619 | A1* | 6/2021 | Schober | H04W 72/082 |

OTHER PUBLICATIONS

Oppo: "Remaining Issues on SRS Design", 3GPP Draft, 3GPP TSG RAN WG1 Meeting #93, R1-1806828, 3RD Generation Partnership Project (3GPP), Mobile Competence Centre, 650, Route Des Lucioles, F-06921, Sophia-Antipolis Cedex, France, vol. RAN WG1, No. Busan, Korea; May 21, 2018-May 25, 2018, May 11, 2018 (May 11, 2018), XP051461980, 3 pages, Retrieved from the Internet: URL: http://www.3gpp.org/ftp/tsg%5Fran/WG1%5FRL1/TSGR1% 5F93/Docs [retrieved on May 11, 2018] p. 1-p. 3.

Qualcomm Incorporated: "UL Reference Signals for NR Positioning", 3GPP Draft, R1-1907297, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 4, 2019 (May 4, 2019), XP051709320, 4 pagess, Retrieved from the Internet: URL: http://www.3gpp.org/ftp/tsg%5Fran/WG1%5FRL1/TSGR1%5F97/Docs/R1%2D1907297%2Ezip. [retrieved on May 4, 2019] the whole document.

Qualcomm Incorporated: "UL Reference Signals for NR Positioning", 3GPP DRaft, R1-1911133, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 5, 2019 (Oct. 5, 2019), XP051808856, 7 pages, Retrieved from the Internet: URL: https://ftp.3gpp.org/tsg_ran/WG1_RL1/TSGR1_98b/Docs/R1-1911133.zip. [retrieved on Oct. 5, 2019] the whole document.

Qualcomm Incorporated: "Considerations on NR Positioning Using Prs", 3GPP Draft, R1-1811287, (OTDOA-RTT-PRS), 3rd Generation Partnership Project (3GPP), Mobile Competence Centre, 650, Route Des Lucioles F-06921 Sophia-Antipolis Cedex, France, vol. RAN WG1, No. Chengdu, CN; Oct. 8, 2018-Oct. 12, 2018, Sep. 29, 2018 (Sep. 29, 2018), XP051518690, 4 Pages, Retrieved from the Internet: URL: https://www.3gpp.org/ftp/tsg ran/WG1_RL1/TSGR1_94b/Docs/R1-1811287.zip [retrieved on Sep. 20, 2018], * chapters 2. 3.3. 3.5. 3.6.4.

Bressner T.A.H., "Development and Evaluation of UTDoA as a Positioning Method in LTE", Spring Semester, 2015, 77 pages.

* cited by examiner

SOUNDING REFERENCE SIGNAL (SRS) RESOURCE AND RESOURCE SET CONFIGURATIONS FOR POSITIONING

CROSS-REFERENCE TO RELATED APPLICATIONS

The present Application for Patent claims priority under 35 U.S.C. § 119 to Greek Patent Application No. 20190100070, entitled "SOUNDING REFERENCE SIGNAL RESOURCE AND RESOURCE SET CONFIGURATIONS FOR POSITIONING," filed Feb. 8, 2019, which is assigned to the assignee hereof, and expressly incorporated herein by reference in its entirety.

TECHNICAL FIELD

Various aspects described herein generally relate to wireless communication systems, and more particularly, to sounding reference signal (SRS) and resource set configuration for positioning.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 GHz to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference radio frequency (RF) signals received from two or more network nodes (e.g., different base stations or different transmission points (e.g., antennas) belonging to the same base station). The mobile device can also be configured to report the time of arrival (ToA) of RF signals.

With OTDOA, when the mobile device reports the time difference of arrival (TDOA) between RF signals from two network nodes, the location of the mobile device is then known to lie on a hyperbola with the locations of the two network nodes as the foci. Measuring TDOAs between multiple pairs of network nodes allows for solving for the mobile device's position as intersections of the hyperbolas.

Round trip time (RTT) is another technique for determining a position of a mobile device. RTT is a two-way messaging technique (network node to mobile device and mobile device to network node), with both the mobile device and the network node reporting their receive-to-transmit (Rx-Tx) time differences to a positioning entity, such as a location server or location management function (LMF), that computes the mobile device's position. This allows for computing the back-and-forth flight time between the mobile device and the network node. The location of the mobile device is then known to lie on a circle with a center at the network node's position. Reporting RTTs with multiple network nodes allows the positioning entity to solve for the mobile device's position as the intersections of the circles.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In an aspect, user equipment (UE) includes a memory; at least one processor; and at least one transceiver, wherein the at least one transceiver is configured to: receive a sounding reference signal (SRS) configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and transmit a positioning SRS as an uplink positioning signal utilizing one or more positioning SRS ports, each positioning SRS port being an SRS port of an SRS resource of an SRS resource set defined in the SRS configuration, wherein the positioning SRS is transmitted in a positioning SRS pattern such that across N consecutive symbols, where N is greater than or equal to two, SRS resource elements (REs) to which the one or more positioning SRS ports are mapped are staggered in frequency and use each of the N consecutive symbols.

In an aspect, a base station includes a memory; at least one processor; and at least one transceiver, wherein the at least one transceiver is configured to: send an SRS configuration to a UE, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and receive a positioning SRS as an uplink positioning signal utilizing one or more positioning SRS ports, each positioning SRS port being an SRS port of an SRS resource of an SRS resource set defined in the SRS configuration, wherein the positioning SRS is received in a positioning SRS pattern such that across N consecutive symbols, where N is greater than or equal to two, SRS REs to which the one or more positioning SRS ports are mapped are staggered in frequency and use each of the N consecutive symbols.

In an aspect, a method performed by a UE includes receiving an SRS configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and transmitting a positioning SRS as an uplink positioning signal utilizing one or more positioning SRS ports, each positioning SRS port being an SRS port of an SRS resource of an SRS resource set defined in the SRS configuration, wherein the positioning SRS is transmitted in a positioning SRS pattern such that across N consecutive symbols, where N is greater than or equal to two, SRS REs to which the one or more positioning SRS ports are mapped are staggered in frequency and use each of the N consecutive symbols.

In an aspect, a method performed by a cell of a base station includes sending an SRS configuration to a UE, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and receiving a positioning SRS as an uplink positioning signal utilizing one or more positioning SRS ports, each positioning SRS port being an SRS port of an SRS resource of an SRS resource set defined in the SRS configuration, wherein the positioning SRS is received in a positioning SRS pattern such that across N consecutive symbols, where N is greater than or equal to two, SRS REs to which the one or more positioning SRS ports are mapped are staggered in frequency and use each of the N consecutive symbols.

In an aspect, a UE includes means for receiving an SRS configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and means for transmitting a positioning SRS as an uplink positioning signal utilizing one or more positioning SRS ports, each positioning SRS port being an SRS port of an SRS resource of an SRS resource set defined in the SRS configuration, wherein the positioning SRS is transmitted in a positioning SRS pattern such that across N consecutive symbols, where N is greater than or equal to two, SRS REs to which the one or more positioning SRS ports are mapped are staggered in frequency and use each of the N consecutive symbols.

In an aspect, a base station includes means for sending an SRS configuration to a UE, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and means for receiving a positioning SRS as an uplink positioning signal utilizing one or more positioning SRS ports, each positioning SRS port being an SRS port of an SRS resource of an SRS resource set defined in the SRS configuration, wherein the positioning SRS is received in a positioning SRS pattern such that across N consecutive symbols, where N is greater than or equal to two, SRS REs to which the one or more positioning SRS ports are mapped are staggered in frequency and use each of the N consecutive symbols.

In an aspect, a non-transitory computer-readable medium storing computer-executable instructions includes computer-executable instructions comprising: one or more instructions instructing a UE to receive an SRS configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and one or more instructions instructing the UE to transmit a positioning SRS as an uplink positioning signal utilizing one or more positioning SRS ports, each positioning SRS port being an SRS port of an SRS resource of an SRS resource set defined in the SRS configuration, wherein the positioning SRS is transmitted in a positioning SRS pattern such that across N consecutive symbols, where N is greater than or equal to two, SRS REs to which the one or more positioning SRS ports are mapped are staggered in frequency and use each of the N consecutive symbols.

In an aspect, a non-transitory computer-readable medium storing computer-executable instructions includes computer-executable instructions comprising: one or more instructions instructing a base station to send an SRS configuration to a UE, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and one or more instructions instructing the base station to receive a positioning SRS as an uplink positioning signal utilizing one or more positioning SRS ports, each positioning SRS port being an SRS port of an SRS resource of an SRS resource set defined in the SRS configuration, wherein the positioning SRS is received in a positioning SRS pattern such that across N consecutive symbols, where N is greater than or equal to two, SRS REs to which the one or more positioning SRS ports are mapped are staggered in frequency and use each of the N consecutive symbols.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
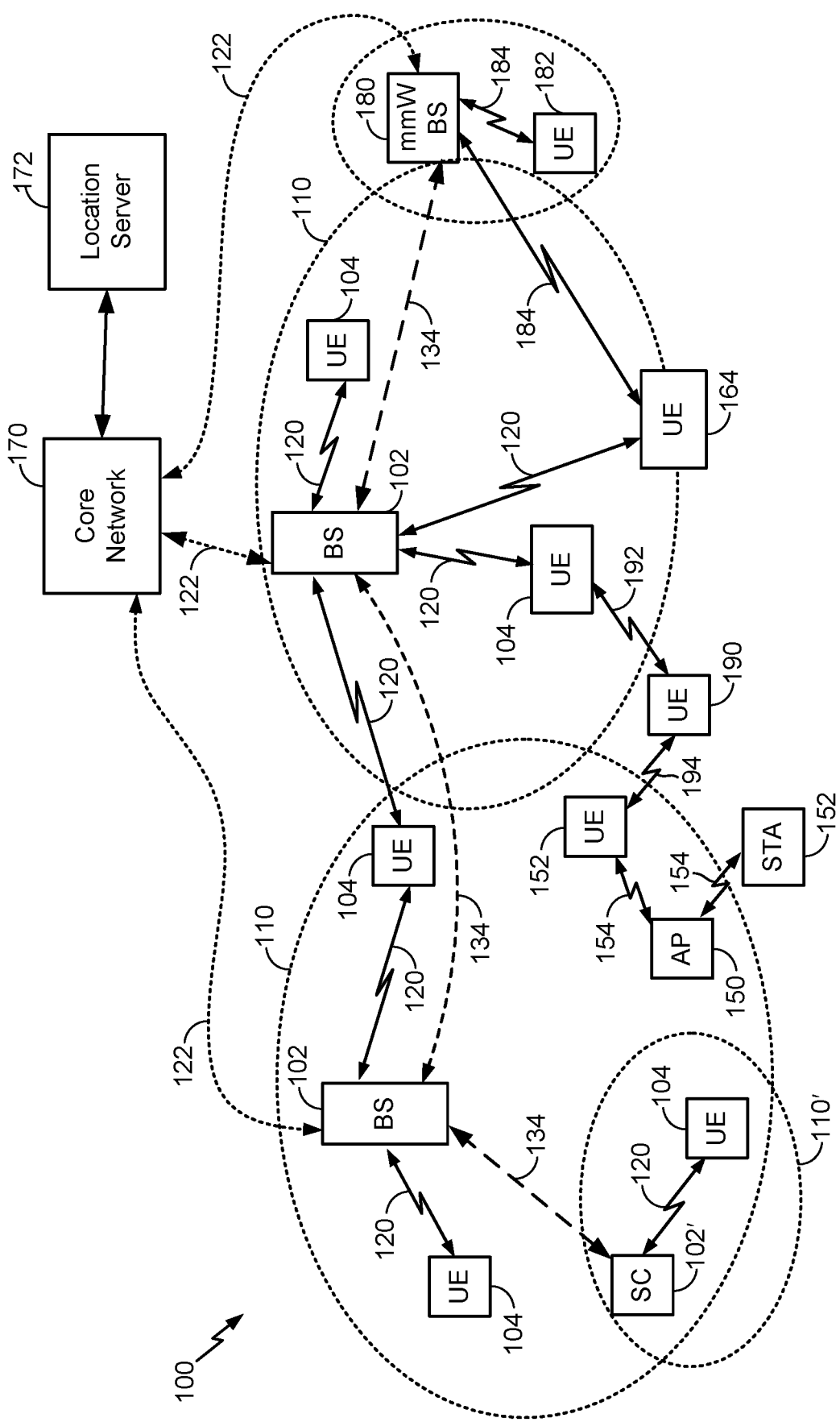
FIG. 1 illustrates an exemplary wireless communications system in accordance with one or more aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations 102' may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling each other to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 MHz to 6000 MHz), FR2 (from 24250 MHz to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
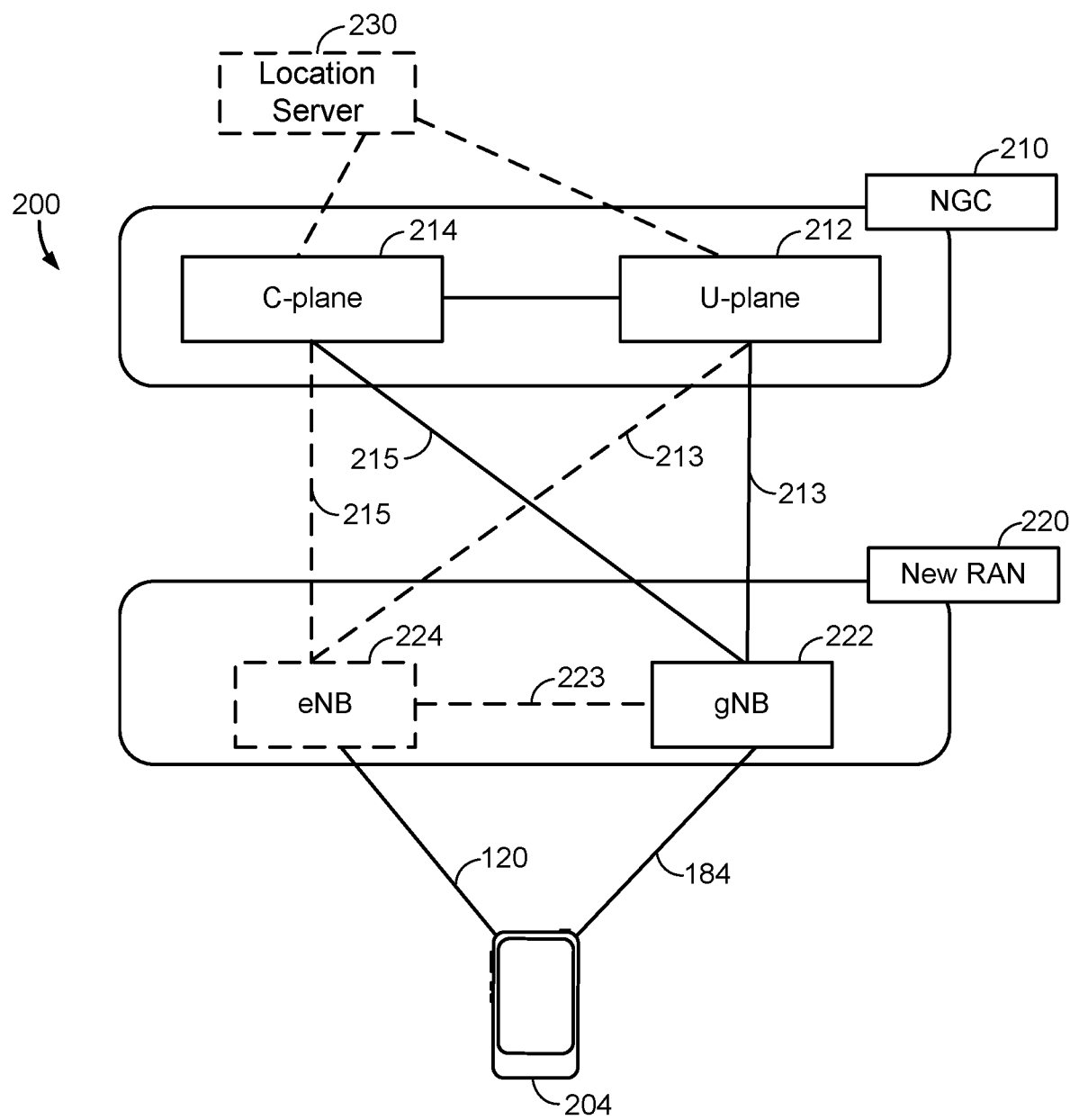
FIGS. 2A and 2B illustrate exemplary wireless network structures in accordance with one or more aspects of the disclosure.

According to various aspects, FIG. 2A illustrates an exemplary wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to the user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
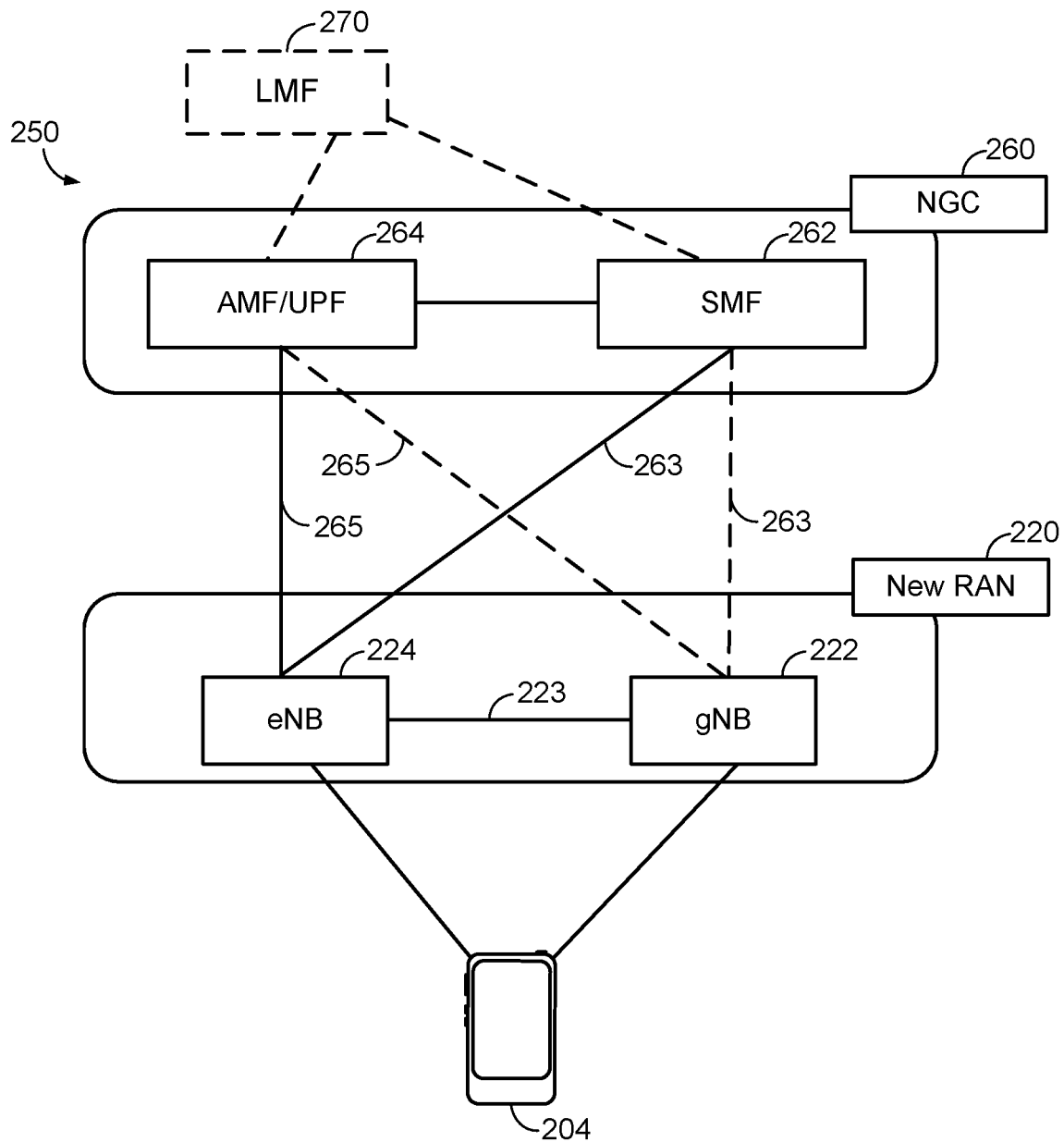

According to various aspects, FIG. 2B illustrates another exemplary wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB 222 having direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
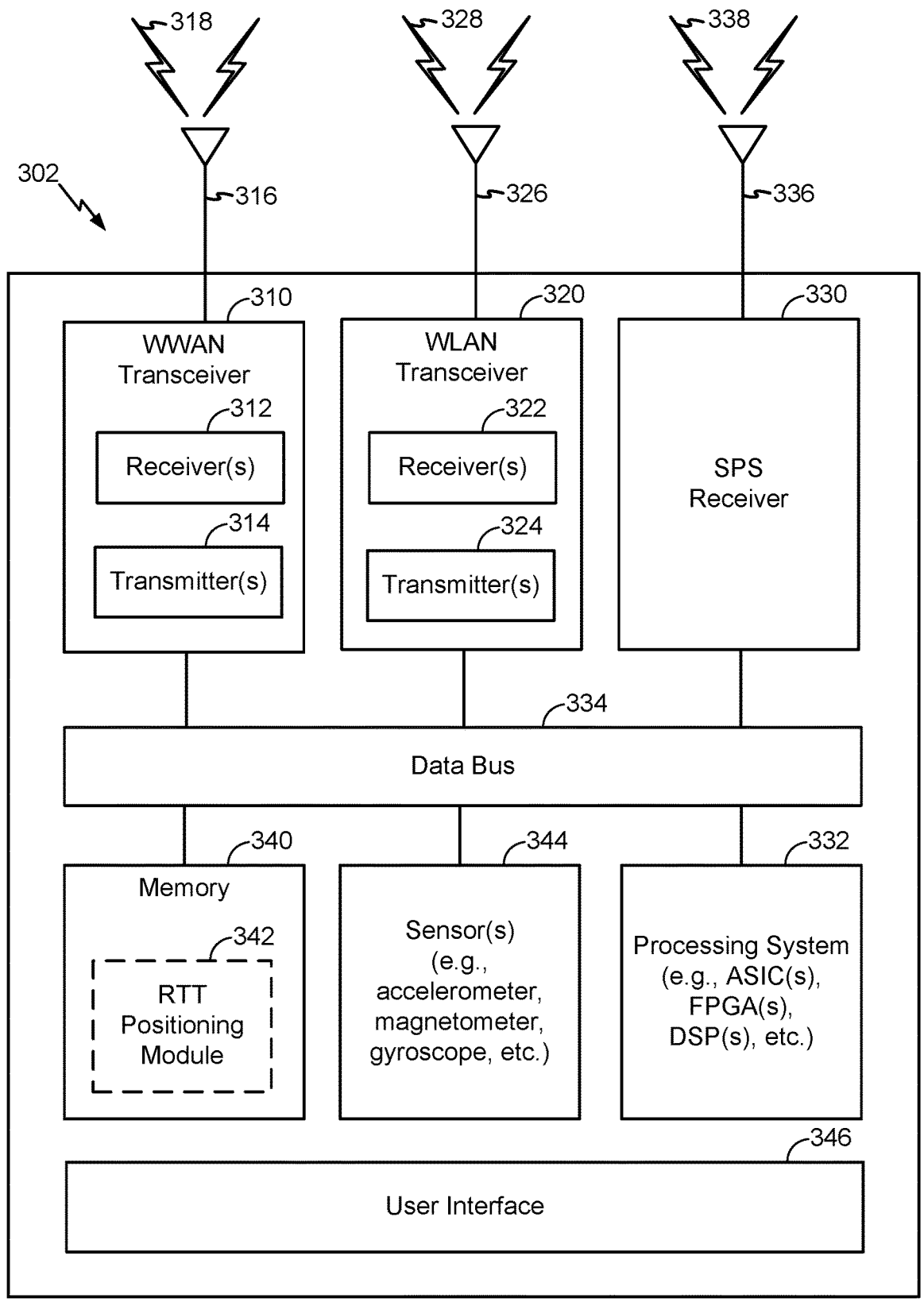
FIGS. 3A to 3C are simplified block diagrams of several exemplary aspects of components that may be employed in wireless communication nodes and configured to support communication in accordance with one or more aspects of the disclosure.
Figure 3B:
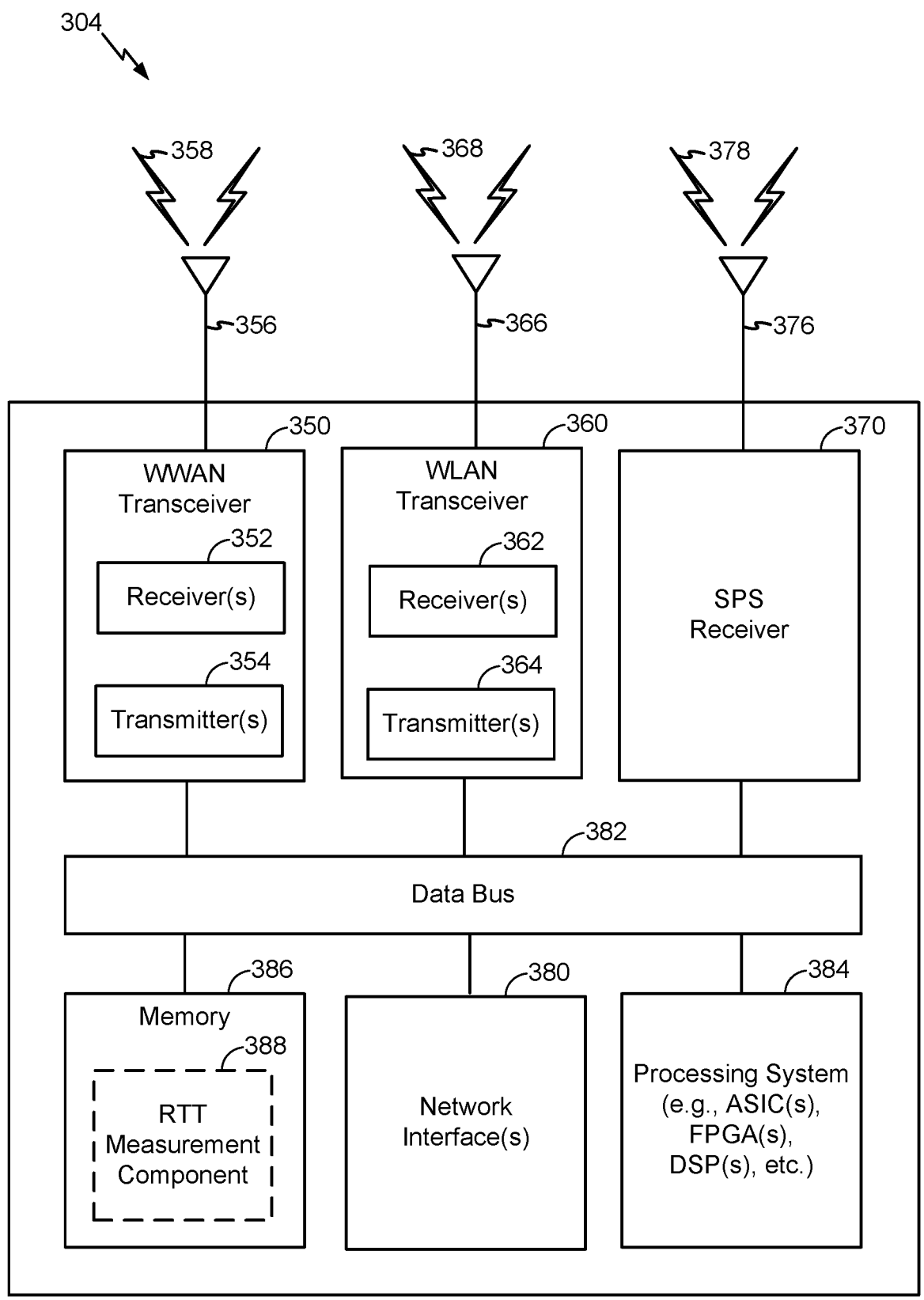
Figure 3C:
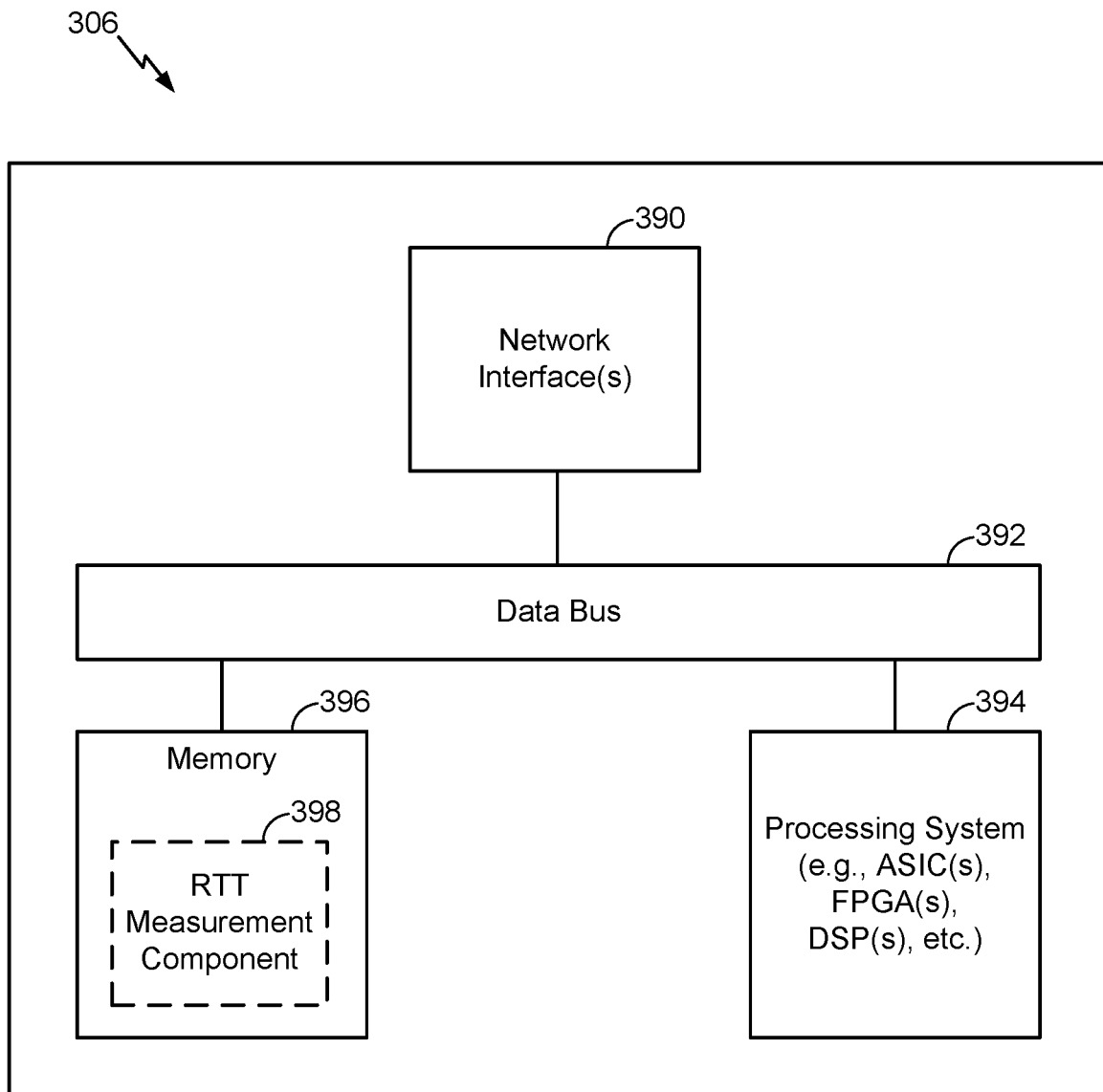

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceivers 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and perform calculations necessary to determine positions of the UE 302 and the base station 304 using measurements obtained by any suitable SPS algorithm.

The base station 304 and the network entity 306 each include at least one network interface 380 and 390, respectively, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, sounding reference signals (SRS) transmissions as disclosed herein, and for providing other processing functionality. The base station 304 includes a processing system 384 for providing functionality relating to, for example, SRS configuration and reception as disclosed herein, and for providing other processing functionality. The network entity 306 includes a processing system 394 for providing functionality relating to, for example, SRS configuration as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RTT measurement components 342, 388, and 398, respectively. The RTT measurement components 342, 388, and 398 may be hardware circuits that are part of or coupled to the processing systems 332, 384, and 394, respectively, that, when executed, cause the UE 302, the base station 304, and the network entity 306 to perform the functionality described herein. Alternatively, the RTT measurement components 342, 388, and 398 may be memory modules (as shown in FIGS. 3A-C) stored in the memory components 340, 386, and 396, respectively, that, when executed by the processing systems 332, 384, and 394, cause the UE 302, the base station 304, and the network entity 306 to perform the functionality described herein.

The UE 302 may include one or more sensors 344 coupled to the processing system 332 via a data bus 334 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RTT measurement components 342, 388, and 398, etc.

Figure 4:
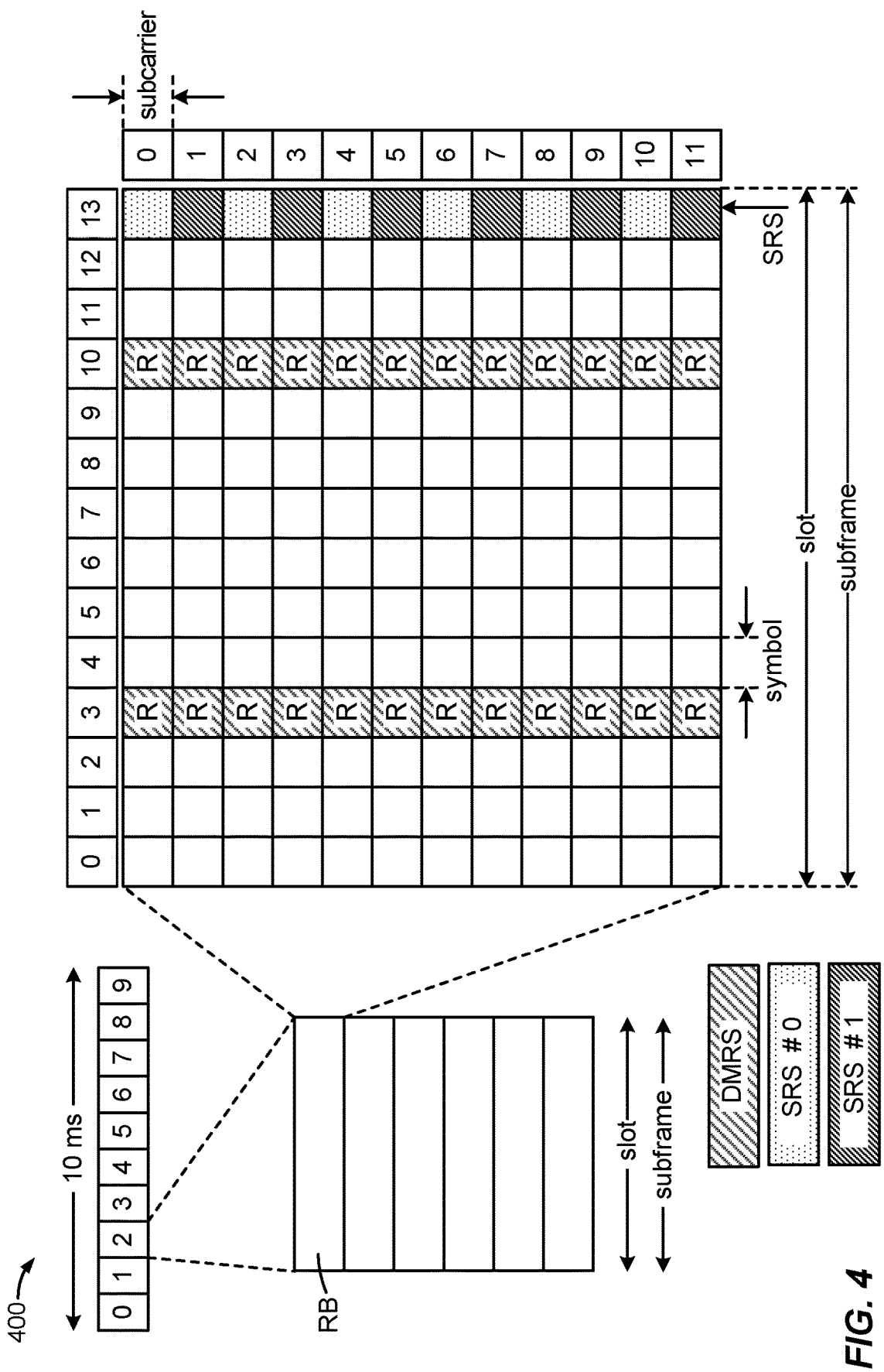
FIG. 4 is a diagram illustrating an exemplary frame structure in accordance with one or more aspects of the disclosure.

Various frame structures may be used to support downlink and uplink transmissions between network nodes (e.g., base stations and UEs). FIG. 4 is a diagram 400 illustrating an example of an uplink frame structure, according to aspects of the disclosure. LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Sub-carrier spacing (kHz) | Symbols/ slot | slots/ sub-frame | slots/ frame | slot (ms) | Symbol duration (µs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

In the example of FIG. 4, a numerology of 15 kHz is used. Thus, in the time domain, a frame (e.g., 10 ms) is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4, some of the REs carry demodulation reference signals (DMRS) for channel estimation at the base station. The UE may additionally transmit sounding reference signals (SRS) in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of resource elements that are used for transmission of SRS is referred to as an "SRS resource." The collection of resource elements can span multiple PRBs in the frequency domain and N (e.g., 1 or more) consecutive symbol(s) within a slot in the time domain. In a given OFDM symbol, an SRS resource occupies consecutive PRBs. An "SRS resource set" is a set of SRS resources used for the transmission of SRS signals.

Several enhancements over the previous definition of SRS have been proposed for SRS for positioning, such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active bandwidth part (BWP), and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

Conventionally, an SRS resource set can be tagged with one of the following use cases: codebook (CB) based, non-codebook (NCB) based, antenna switching (AntSw), and uplink beam management (ULBM). The CB and NCB use cases are for uplink traffic, the AntSw use case is to facilitate downlink traffic, and the ULBM use case allows the UE to find the correct uplink beam to transmit data. In other words, the existing use cases are for communication purposes, i.e., to enhance communication between the UE and the serving base station (or serving cell). For example, the UE may transmit the SRS and the base station may use the received SRS to determine the quality of the communication channel between the base station and the UE (e.g., for scheduling and link adaptation).

Each SRS resource set can have multiple SRS resources. A codebook based set can have up to two (2) SRS resources, a non-codebook based set can have up to four (4) SRS resources, an uplink beam management set can have up to sixteen (16) SRS resources, and an antenna switching set can have up to four (4) SRS resources. An SRS resource can contain one (1), two (2), or four (4) antenna ports with a comb-2 or comb-4 pattern and span specific symbols and physical resource blocks (PRBs) in the frequency domain. All antenna ports (or simply "ports") on an SRS resource have an assigned comb offset where no frequency staggering of the resource elements (REs) inside the SRS resource is allowed. The comb offset is the difference between the first subcarrier of a comb pattern and a reference subcarrier (e.g., the first subcarrier of a resource block). For example, in FIG. 4, "SRS #0" has a comb offset of 0 (there are no subcarriers between the first subcarrier of "SRS #0" and subcarrier 0) and "SRS #1" has a comb offset of 1 (there is one subcarrier between the first subcarrier of "SRS #1" and subcarrier 0).

The conventional SRS configuration also includes time-domain constraints. For example, a UE may be configured by a higher layer parameter resourceMapping in SRS-Resource with an SRS resource occupying $N_S \in \{1,2,4\}$ adjacent symbols within the last six (6) symbols of the slot, in which all antenna ports of the SRS resources are mapped to each symbol of the resource. When a physical uplink shared channel (PUSCH) and an SRS are transmitted in the same slot, the UE can only be configured to transmit the SRS after the PUSCH and the corresponding DMRS are transmitted. In other words, the SRS is transmitted last within a slot, as illustrated in FIG. 4.

Figure 5:
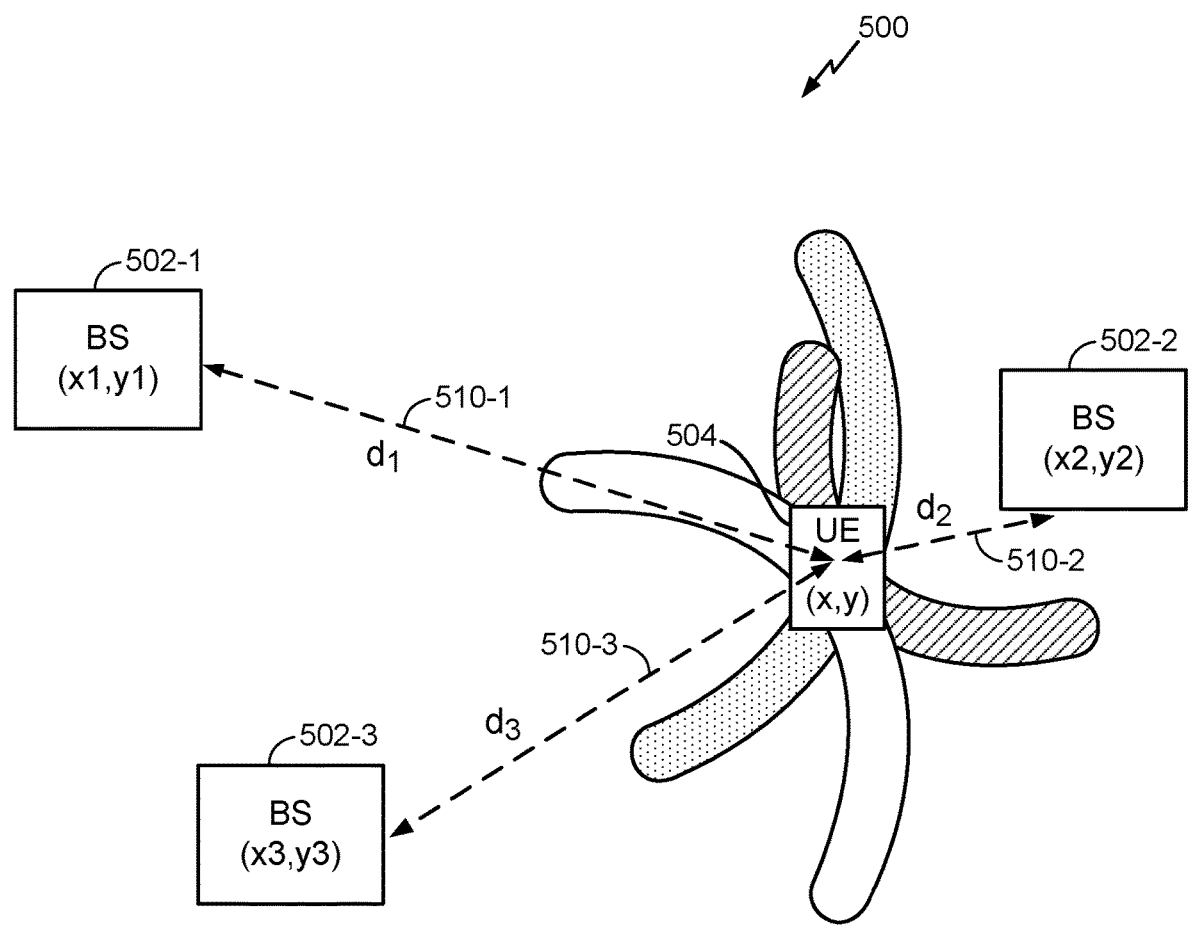
FIG. 5 illustrates a scenario for determining a position of a UE through a multi-RTT procedure in accordance with one or more aspects of the disclosure.

FIG. 5 illustrates an exemplary wireless communications system 500 according to aspects of the disclosure. In the example of FIG. 5, a UE 504 (which may correspond to any of the UEs described herein) is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 (collectively, base stations 502, and which may correspond to any of the base stations described herein) using RF signals and standardized protocols for the modulation of the RF signals and the exchange of information packets. By extracting different types of information from the exchanged RF signals, and utilizing the layout of the wireless communications system 500 (i.e., the base stations' locations, geometry, etc.), the UE 504 may determine its position, or assist in the determination of its position, in a predefined reference coordinate system. In an aspect, the UE 504 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 504 and three base stations 502, as will be appreciated, there may be more UEs 504 and more base stations 502.

To support position estimates, the base stations 502 may be configured to broadcast reference RF signals (e.g., positioning reference signals (PRS), navigation reference signals (NRS), cell-specific reference signals (CRS), tracking reference signals (TRS), channel state information reference signals (CSI-RS), primary synchronization signals (PSS), or secondary synchronization signals (SSS), etc.) to UEs 504 in their coverage area to enable a UE 504 to measure characteristics of such reference RF signals. For example, the UE 504 may measure the time of arrival (ToA) of specific reference RF signals (e.g., PRS, NRS, CRS, CSI-RS, etc.) transmitted by at least three different base stations 502-1, 502-2, and 502-3 and may use the RTT positioning method to report these ToAs (and additional information) back to the serving base station 502 or another positioning entity (e.g., location server 230, LMF 270).

In an aspect, although described as the UE 504 measuring reference RF signals from a base station 502, the UE 504 may measure reference RF signals from one of multiple cells supported by a base station 502. Where the UE 504 measures reference RF signals transmitted by a cell supported by a base station 502, the at least two other reference RF signals measured by the UE 504 to perform the RTT procedure would be from cells supported by base stations 502 different from the first base station 502 and may have good or poor signal strength at the UE 504.

In order to determine the position (x, y) of the UE 504, the entity determining the position of the UE 504 needs to know the locations of the base stations 502, which may be represented in a reference coordinate system as $(x_k, y_k)$, where k=1, 2, 3 in the example of FIG. 5. Where one of the base stations 502 (e.g., the serving base station) or the UE 504 determines the position of the UE 504, the locations of the involved base stations 502 may be provided to the serving base station 502 or the UE 504 by a location server with knowledge of the network geometry (e.g., location server 230, LMF 270). Alternatively, the location server may determine the position of the UE 504 using the known network geometry.

Either the UE 504 or the respective base station 502 may determine the distance 510 ($d_k$, where k=1, 2, 3) between the UE 504 and the respective base station 502. Specifically, the distance 510-1 between the UE 504 and base station 502-1 is $d_1$, the distance 510-2 between the UE 504 and base station 502-2 is $d_2$, and the distance 510-3 between the UE 504 and base station 502-3 is $d_3$. In an aspect, the RTT of signals exchanged between the UE 504 and any base station 502 can be determined and converted to a distance 510 ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 504 and the base stations 502 are the same. However, such an assumption may not be true in practice.

Once each distance 510 is determined, the UE 504, a base station 502, or the location server (e.g., location server 230, LMF 270) can solve for the position (x, y) of the UE 504 by using a variety of known geometric techniques, such as, for example, trilateration. From FIG. 5, it can be seen that the position of the UE 504 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 504 from the location of a base station 502). The intersection of the two directions at or near the point (x, y) can provide another estimate of the location for the UE 504.

A position estimate (e.g., for a UE 504) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 6:
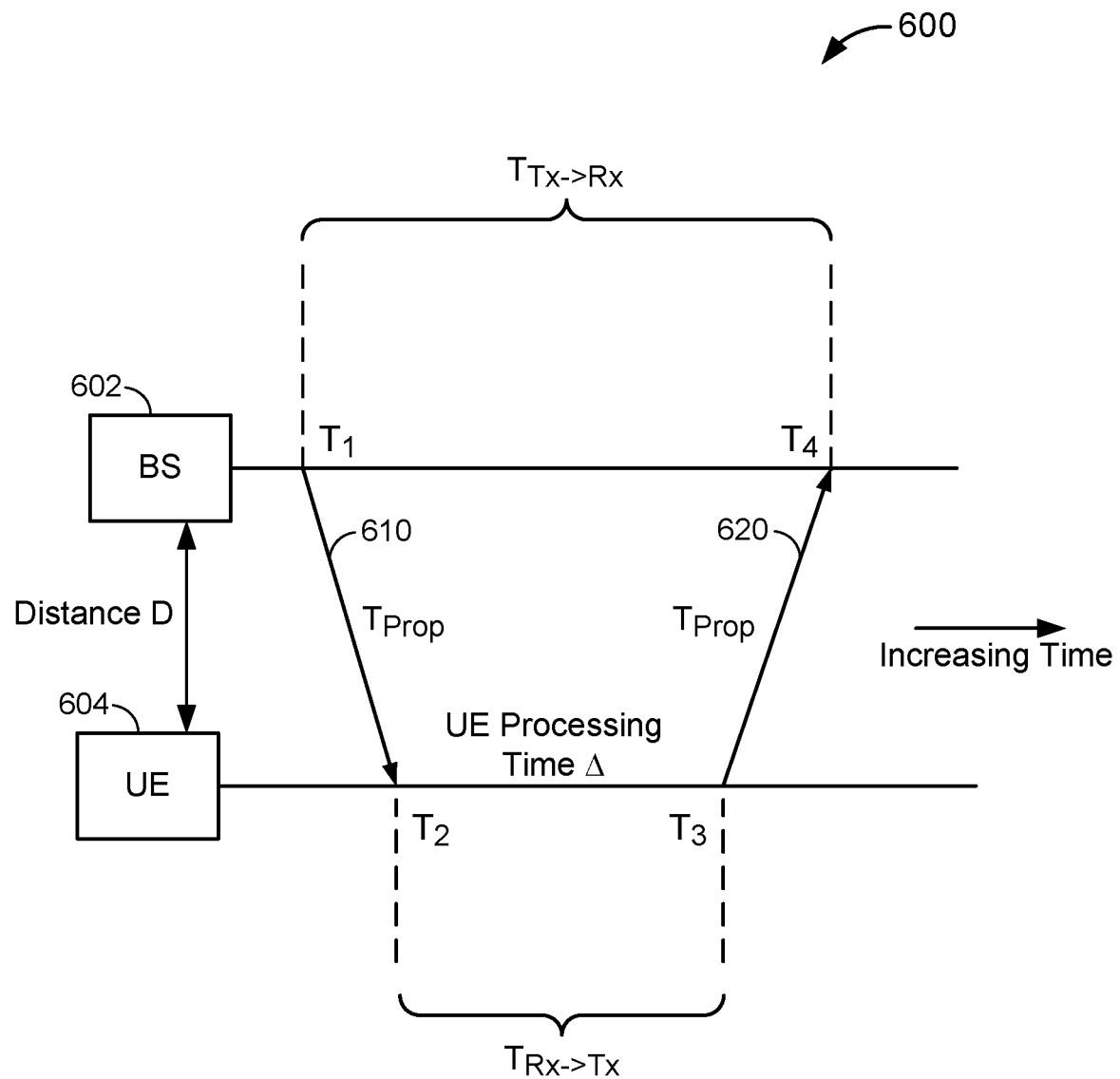
FIG. 6 illustrates a diagram of exemplary timings for determining an RTT between a cell and a UE in accordance with one or more aspects of the disclosure.

FIG. 6 is an exemplary diagram 600 showing exemplary timings of RTT measurement signals exchanged between a base station 602 (e.g., any of the base stations described herein) and a UE 604 (e.g., any of the UEs described herein), according to aspects of the disclosure. In the example of FIG. 6, the base station 602 sends an RTT measurement signal 610 (e.g., PRS, NRS, CRS, CSI-RS, etc.) to the UE 604 at time $T_1$. The RTT measurement signal 610 has some propagation delay $T_{Prop}$ as it travels from the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 (e.g., an SRS, UL-PRS) at time $T_3$. After the propagation delay $T_{Prop}$, the base station 602 receives/measures the RTT response signal 620 from the UE 604 at time $T_4$ (the ToA of the RTT response signal 620 at the base station 602).

In order to identify the ToA (e.g., $T_2$) of an RF signal (e.g., an RTT measurement signal 610) transmitted by a given network node, the receiver (e.g., UE 604) first jointly processes all the resource elements (REs) on the channel on which the transmitter (e.g., base station 602) is transmitting the RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the UE 604 may choose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

The RTT response signal 620 may explicitly include the difference between time $T_3$ and time $T_2$ (i.e., $T_{Rx \to Tx}$). Alternatively, it may be derived from the timing advance (TA), i.e., the relative UL/DL frame timing and specification location of UL reference signals. (Note that the TA is usually the RTT between the base station 602 and the UE 604, or double the propagation time in one direction.) Using this measurement and the difference between time $T_4$ and time $T_1$ (i.e., $T_{Tx \to Rx}$), the base station 602 can calculate the distance to the UE 604 as:

$$d = \frac{1}{2c}(T_{Tx \to Rx} - T_{Rx \to Tx}) = \frac{1}{2c}(T_4 - T_1) - \frac{1}{2c}(T_3 - T_2)$$

where c is the speed of light.

Note that the UE 604 can perform an RTT procedure with multiple base stations 602. However, the RTT procedure does not require synchronization between these base stations 602.

As described above, conventionally, SRS are used for communication purposes. In one or more aspects, it is proposed to utilize SRS for positioning purposes as well. That is, it is proposed to utilize SRS as an uplink positioning reference signal (UL-PRS). In an aspect, an SRS may be used for positioning purposes only, or for positioning and other purposes (e.g., communication purposes), or for non-positioning purposes (e.g., communication purposes only).

In an aspect, a cell (or TRP) and a UE may signal each other to determine which SRS will be used for positioning purposes. Different signaling options are available to determine the SRS for positioning. In one option, the SRS may be used for positioning and for other purposes. That is, the SRS may be used for multiple purposes.

The following should be noted. There can be a pool of SRS resources configured by the network (e.g., by the cell serving the UE) for use by the UE. The pool of SRS resources may be grouped into one or more SRS resource sets in which each set includes one or more SRS resources of the pool. In an aspect, an SRS resource can be a member of one SRS resource set or a member of multiple SRS resource sets. Thus, an SRS resource may be used for different purposes in different SRS resource sets. For example, an SRS resource may be used for positioning in one SRS resource set and used for communication in another SRS resource set. Each SRS resource may contain one or more SRS ports with a comb-N (N being an integer) pattern and span specific symbols and PRBs.

In an aspect, SRS may be configured to be used for positioning purposes at an SRS resource set level, at an SRS resource level, and/or at an SRS port level. For example, at the SRS resource set level, an SRS resource set may be tagged for codebook (CB) and positioning, non-codebook (NCB) and positioning, antenna switching (AntSw) and positioning, or uplink beam management (ULBM) and positioning.

Alternatively, the cell may configure one or more SRS resource sets for purposes that do not include positioning. For example, the cell may configure an SRS resource set with an SRS set ID "X" as a CB resource set (the cell may configure each SRS resource set with an SRS set ID). The UE may notify the cell that it will also use the SRS resource set identified by the SRS set ID "X" for positioning purposes, and the cell may acknowledge the UE's notification.

When an SRS resource set is configured by the cell to be used for positioning purposes, it may also be referred to as a configured positioning SRS resource set. When an SRS resource set is designated by the UE to be used for positioning purposes, it may also be referred to as a designated positioning SRS resource set. Both may be broadly referred to as a positioning SRS resource set.

In another aspect, the tagging for positioning purposes may occur at the SRS resource level. That is, even if an SRS resource set is not specifically tagged to be used for positioning purposes, one or more SRS resources of the SRS resource set may be configured or designated to be used for positioning purposes, for example, tagged as CB and positioning, NCB and positioning, AntSw and positioning, and/or ULBM and positioning. In other words, a subset (some or all) of the SRS resources of the SRS resource set may be configured to be used for positioning purposes (as well as for other purposes). Note that if all of the SRS resources of the SRS resource set are configured for positioning purposes, this is effectively the same as configuring the SRS resource set itself.

Alternatively, the cell may not configure an SRS resource set or one or more SRS resources of a SRS resource set for positioning purposes. For example, the cell may configure an SRS resource of an SRS resource set for purposes other than for positioning (e.g., an SRS resource with an SRS resource ID "Y" of an SRS resource set with an SRS set ID "X"). In this instance, the UE may notify the cell that it will use the SRS resource "Y" of the SRS resource set "X" for positioning, and the cell may acknowledge the UE's notification.

When an SRS resource is configured by the cell to be used for positioning purposes, it may also be referred to as a configured positioning SRS resource. When an SRS resource is designated by the UE to be used for positioning purposes, it may also be referred to as a designated positioning SRS resource. Both may be broadly referred to as a positioning SRS resource.

In another aspect, the tagging for positioning may occur at the antenna port (or simply "port") level. That is, even if an SRS resource and its parent SRS resource set are not used for positioning purposes, one or more ports of the SRS resource may be configured for positioning purposes, for example, configured as CB and positioning, NCB and positioning, AntSw and positioning, and/or ULBM and positioning. In other words, a subset (some or all) of the ports of the SRS resource may be configured to be used for positioning purposes (as well as for other purposes). Note that if all SRS ports of the SRS resource are configured to be used for positioning purposes, this is effectively the same as configuring the SRS resource itself.

Alternatively, the cell may not configure a port, its parent SRS resource, and its grandparent SRS resource set for positioning purposes. For example, the cell may configure a port of an SRS resource of an SRS resource set for purposes other than for positioning (e.g., an SRS port with an SRS port ID "Z" of an SRS resource with SRS resource ID "Y" of an SRS resource set with an SRS set ID "X"). In this instance, the UE may notify the cell that it will use the SRS port "Z" of the SRS resource "Y" of the SRS resource set "X" for positioning, and the cell may acknowledge the UE's notification.

When a port of an SRS resource is configured by the cell to be used for positioning purposes, it may also be referred to as a configured positioning SRS port. When a port of an SRS resource is designated by the UE to be used for positioning purposes, it may also be referred to as a designated positioning SRS port. Both may be broadly referred to as a positioning SRS port.

Since each SRS resource set comprises one or more SRS resources, and each SRS resource comprises one or more ports, ultimately, one or more ports will be used for positioning regardless of the level of tagging (either configured by the network and/or by the UE designating and notifying the network). In other words, the ports used for positioning through SRS may be defined broadly at the SRS resource set level, at the SRS resource level, or narrowly at the port level. Thus, the range or granularity can be broad or detailed as desired.

In an aspect, the SRS hierarchy may be such that a lower level inherits the tagging of the higher level. For example, tagging (through configuration at the cell or designation at the UE) of an SRS resource to be a positioning SRS resource may implicitly tag all ports of the positioning SRS resource to be positioning SRS ports. As another example, tagging an SRS resource set to be a positioning SRS resource set may implicitly tag all SRS resource sets and their SRS ports of the positioning SRS resource set to be positioning SRS resources and positioning SRS ports.

Figure 7:
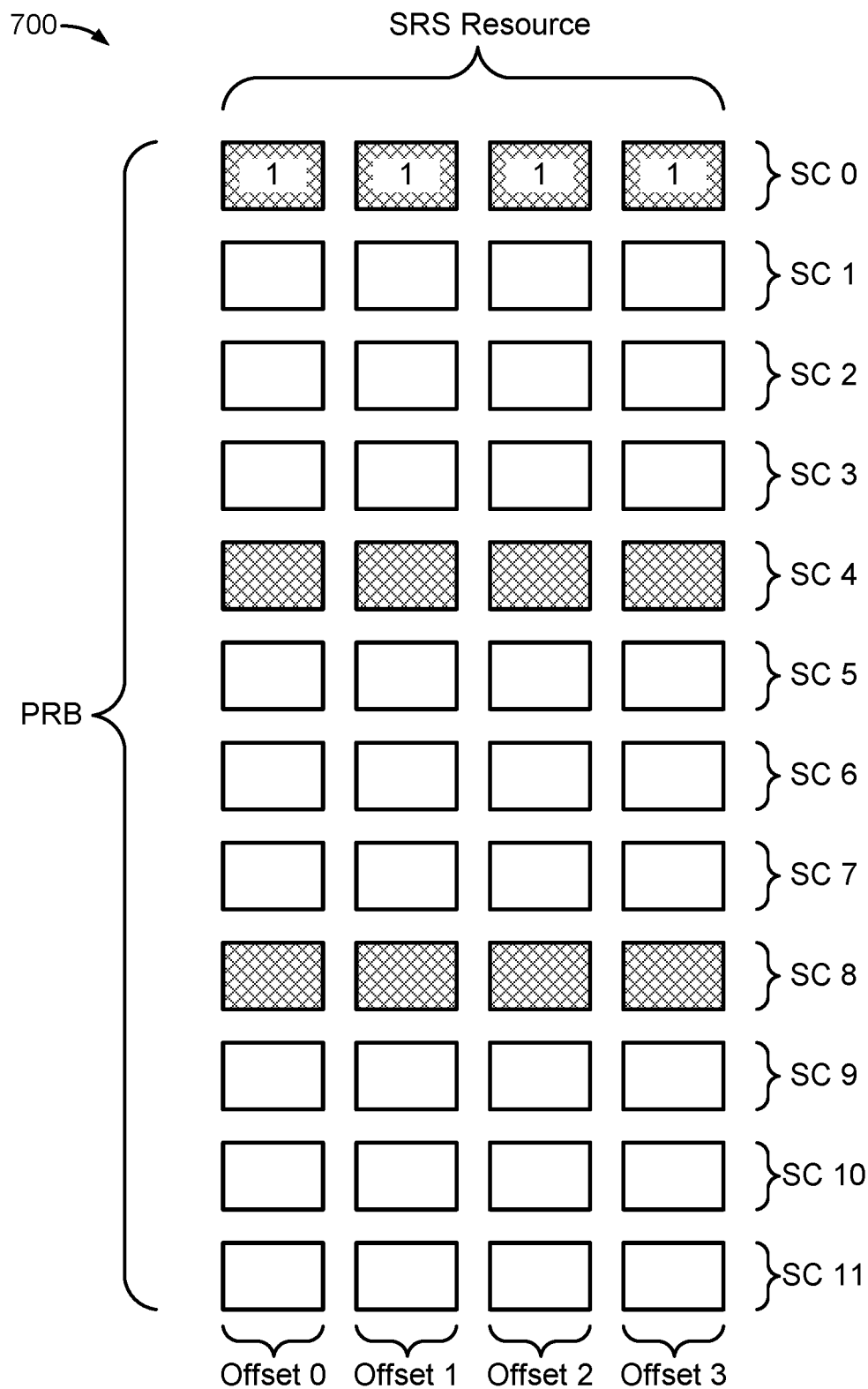
FIG. 7 illustrates an example of a conventional SRS resource pattern.

FIG. 7 illustrates an exemplary pattern of a conventional SRS resource 700, that is, a pattern of an SRS resource that is not used for positioning, but rather, may be used for communication. The illustrated SRS resource 700 spans four consecutive symbols in the time domain (horizontal axis) and 12 subcarriers in the frequency domain (vertical axis), which is equivalent to 1 PRB for a 15 kHz numerology. Each block represents a resource element (RE) having a height of one subcarrier in the frequency domain and a length of one symbol in the time domain. The four symbols in the time domain are labeled with symbol offsets 0 to 3. The hashed boxes represent the REs used for transmitting the SRS. For ease of reference, these will be referred to as SRS REs. The numbers inside the SRS REs represent a mapping of the RE to the port ID of the port used to transmit the SRS. In conventional SRS resource configuration, each port is mapped to a specific subcarrier. Therefore, over the span of four symbols, port 1 is mapped to the same frequency (they are not staggered in frequency).

Figure 8:
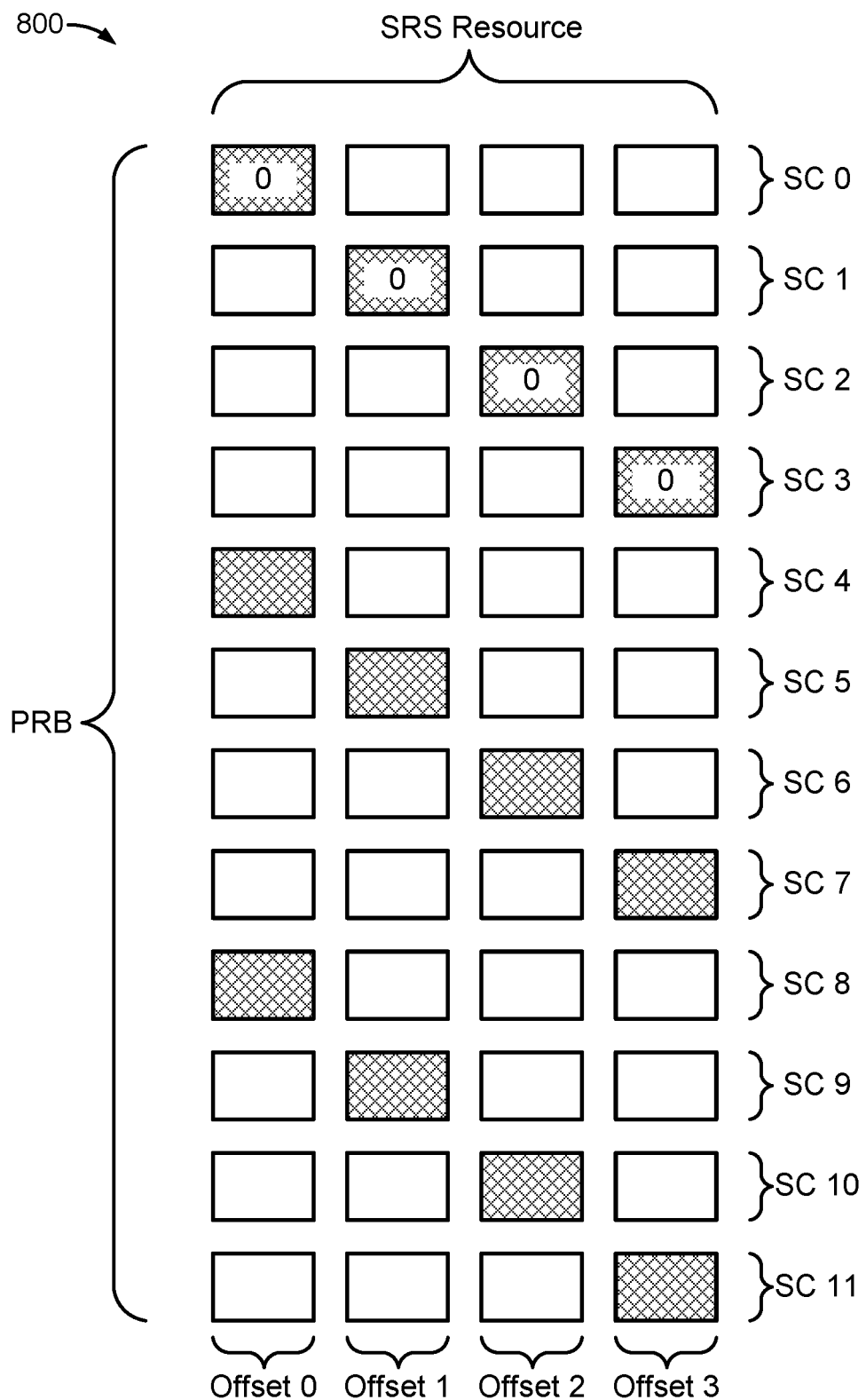
FIG. 8 illustrates an exemplary SRS resource pattern in accordance with one or more aspects of the disclosure.

However, for positioning purposes, it is proposed that the SRS REs be staggered in frequency. In general, it may be said that for positioning, the UE expects a comb-N pattern with repetition of N consecutive symbols and frequency domain staggering such that all comb offsets are used. FIG. 8 illustrates an exemplary pattern of an SRS resource 800 used for positioning, also referred to as a positioning SRS pattern. In other words, an SRS used for positioning transmitted from the UE—also referred to as a positioning SRS—may follow the illustrated positioning SRS pattern.

In the example of FIG. 8, the positioning SRS resource 800 spans four consecutive symbols (e.g., N=4). Of course, N may be any number. Only one PRB (12 subcarriers for 15 kHz numerology) of the positioning SRS resource 800 is illustrated. But in general, a positioning SRS resource may comprise any number of PRBs. The positioning SRS resource 800 may have been configured by the cell (at the SRS resource set level, at the SRS resource level, or at the SRS port level), or the UE may have decided to use an SRS resource not originally configured for positioning. Thus, the positioning SRS resource 800 may be for positioning purposes only or may be for multiple purposes (e.g., communication and positioning).

Regarding the SRS REs mapped to SRS port 0 in FIG. 8, note the following. The pattern is such that the SRS REs are transmitted in each of the four symbols (N consecutive symbols). Also, different subcarriers are used (staggering in the frequency domain). Further, the SRS RE of each subcarrier is mapped such that all four comb offsets (0, 1, 2, 3) are used. That is, in each symbol, a comb size of comb-4 is used, and from one symbol to the next, the start of an SRS transmission begins one subcarrier from the previous symbol. Since each offset represents a different symbol, it may be said that across N consecutive symbols, the SRS REs are mapped such that all N consecutive symbols are used. As can be seen, this positioning SRS pattern is very different from the conventional SRS pattern illustrated in FIG. 7. As will be appreciated, the frequency staggering of positioning SRS in a pattern across N consecutive symbols can provide improved positioning performance, as discussed herein.

In FIG. 8, a diagonal-down pattern is illustrated. That is, a sequence (0,0), (1,1), (2,2), (3,3) is illustrated in which first and second elements of the ordered pair represent the offset and the subcarrier, respectively. However, a positioning SRS pattern is not so limited. For example, in one alternative, the pattern may be diagonal-up, for example, (0,3), (1,2), (2,1), (3,0). Indeed, the pattern need not be diagonal at all, for example, (0,0), (1,2), (2,1), (3,0). It is only preferred that over the span of N consecutive symbols (N greater than or equal to 2), the frequency is staggered such that all comb offsets are used. More broadly, it may be said that the frequency is staggered such that all N consecutive symbols are used.

In FIG. 8, it is also shown that the diagonal-down pattern of subcarriers SC 0-3 are repeated for subcarriers SC 4-7 and for subcarriers SC 8-11, each of which may be mapped to different ports. However, this is not a requirement. Each pattern may be set independent of other patterns.

Further, if an SRS resource set has multiple SRS resources, the "staggering and repetition" may only occur in a subset of the SRS resources of the SRS resource set. That is, a subset (e.g., less than all) of the SRS resources of an SRS resource set may be positioning SRS resources (e.g., used for positioning purposes alone or use for positioning and some other purposes). The remaining non-positioning SRS resources (e.g., used for communication purposes only) of the SRS resource set may use the legacy pattern (e.g., FIG. 7) in which no staggering occurs.

In FIG. 8, the positioning SRS resource 800 spans multiple symbols as mentioned previously. In general, if a positioning SRS resource comprises or spans multiple symbols (N symbols, where N is greater than or equal to 2), a port may be mapped to the frequency staggering pattern such that all comb offsets (e.g., comb 0 to comb (N-1)) are used. Since the positioning SRS resource 800 is one SRS resource, the transmitted REs can be assumed to be coherent (i.e., the same antenna port is used). As such, the cell (or TRP) can easily measure them to determine the ToA for positioning purposes (e.g., $T_{gNB,Rx}=T_4$). In an aspect, N may be 2, 4, or 6.

Figure 9:
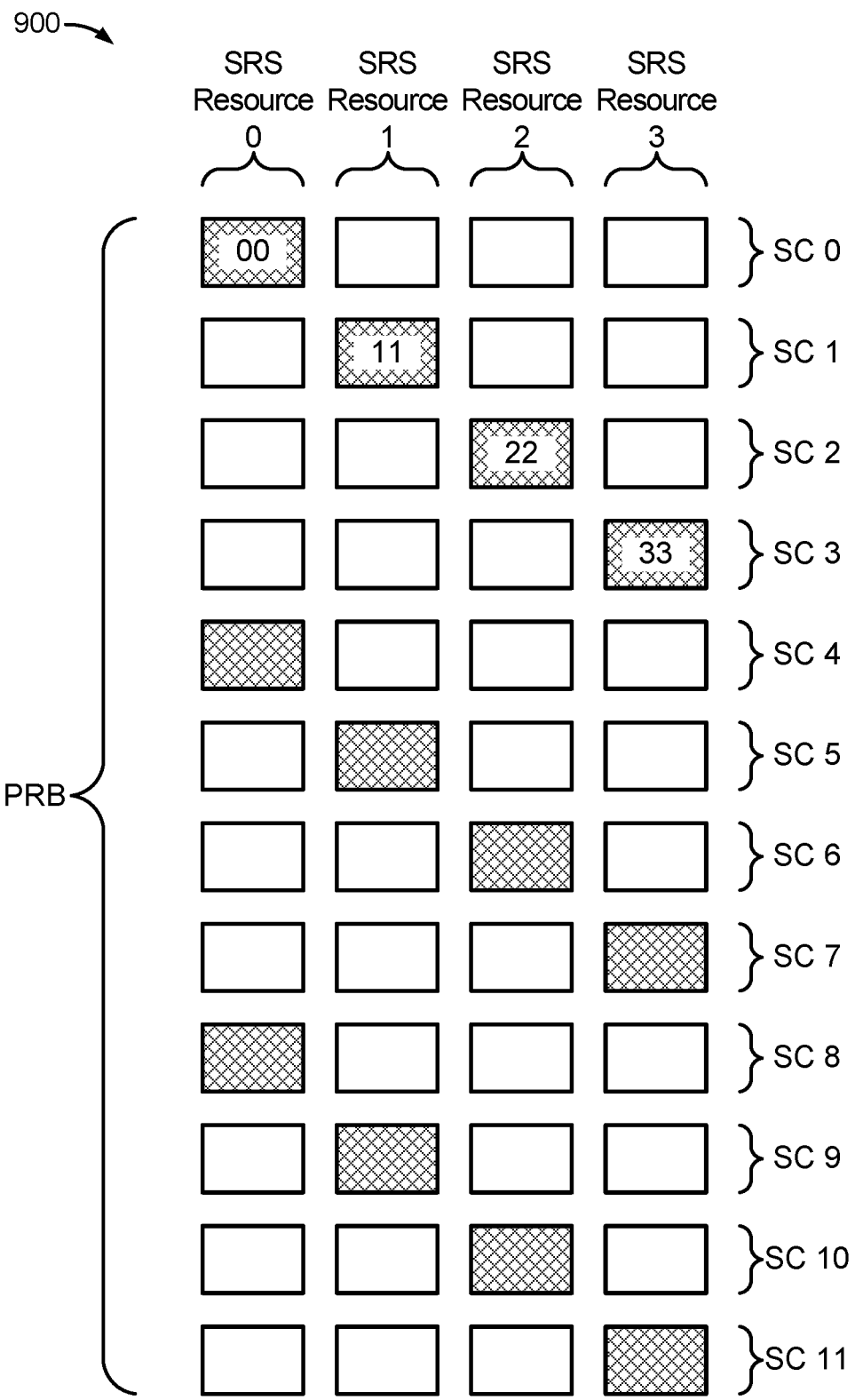
FIG. 9 illustrates another exemplary SRS resource pattern in accordance with one or more aspects of the disclosure.

FIG. 9 illustrates another example pattern for a positioning SRS resource 900. FIG. 9 differs from FIG. 8 in that instead of one positioning SRS resource spanning four (generically N) symbols, FIG. 9 illustrates four (generically N) consecutive positioning SRS resources each spanning one symbol. Thus, the N consecutive positioning SRS resources in FIG. 9 may be said to correspond to N consecutive symbols, instead of one positioning SRS resource corresponding to N consecutive symbols, as in FIG. 8. In one aspect, this may be due to a positioning SRS resource set comprising N SRS resources. In another aspect, this may be due to an SRS resource set comprising N positioning SRS resources.

Regardless, each positioning SRS resource may include one or more SRS ports mapped to SRS REs such that the resulting pattern of SRS REs across all N consecutive SRS resources are staggered in the frequency domain. Note that the SRS pattern in FIG. 9 is similar to the "staggering and repetition" pattern of FIG. 8. That is, across N consecutive symbols, N subcarriers are used. In another perspective, the SRS REs (the resource elements mapped to the SRS ports) may be such that across N consecutive symbols and N consecutive subcarriers, each symbol and each subcarrier is used once.

In one aspect, the UE may be configured with a same port across the N SRS resources. For example, port 00 (of resource 0), port 11 (of resource 1), port 22 (of resource 2), and port 33 (of resource 3) may all be configured to be the same port. In this situation, the cell can coherently combine across the SRS resources to determine the ToA of the SRS for positioning (e.g., $T_{gNB,Rx}=T_4$). In an aspect, the N SRS resources may be transmitted in the same slot in consecutive symbols to ensure coherency.

In another aspect, the same port index of the positioning SRS resources of an SRS resource set may be quasi-collocated across the positioning SRS resources. In this instance, the cell may non-coherently measure across the positioning SRS resources to determine the ToA of the SRS (e.g., $T_{g,NB,Rx}=T_4$).

Note that in both FIGS. 8 and 9, across N consecutive symbols over N consecutive subcarriers, the SRS REs (resource elements mapped to positioning SRS ports) are such that each symbol is used once and each subcarrier is used once.

In FIG. 9, each of the N consecutive positioning SRS resources spans one symbol. While not specifically illustrated, the concept illustrated in FIG. 9 may be generalized in that each of the N positioning SRS resources may span M symbols (where M is greater than or equal to 1) such that the N consecutive positioning SRS resources may correspond to N*M consecutive symbols. In this instance, a positioning SRS port of each positioning SRS resource may be mapped to SRS REs in the M symbols such that across the N consecutive positioning SRS resources, the mapped SRS REs may be staggered in frequency. Within each of the M symbols of each positioning SRS resource, the SRS REs need not be staggered in frequency.

Figure 10:
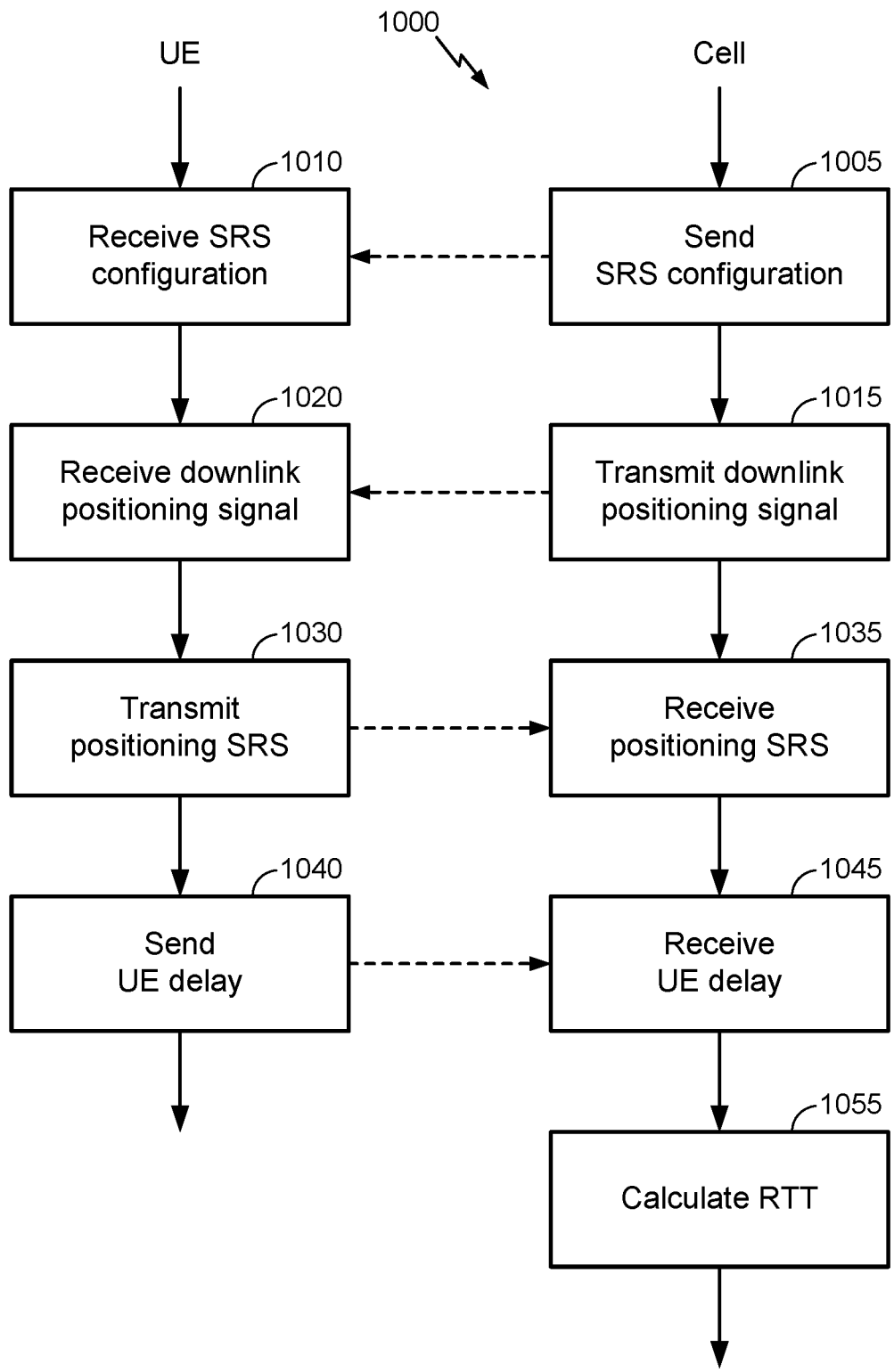
FIG. 10 illustrates an exemplary method performed by a UE and a cell to calculate RTT using positioning SRS in accordance with one or more aspects of the disclosure.

FIG. 10 illustrates an exemplary method 1000 performed by a UE and a cell to calculate an RTT using positioning SRS. At block 1005, the cell (e.g., a serving gNB) may send an SRS configuration to the UE, which is received at block 1010. As discussed, the SRS configuration may define one or more SRS resources of one or more SRS resource sets for use by the UE, in which each SRS resource comprises one or more SRS ports.

At block 1015, the cell may transmit a downlink positioning signal at a first time (e.g., $T_{gNB,Tx}=T_1$). For example, the cell may transmit a downlink positioning reference signal (PRS). At block 1020, the UE may receive the downlink PRS at a second time (e.g., $T_{UE,Rx}=T_2$).

Subsequent to receiving the downlink PRS, at block 1030, the UE may transmit a positioning SRS as an uplink positioning reference signal at a third time (e.g., $T_{UE,Tx}=T_3$). The positioning SRS may utilize one or more positioning SRS ports. Each positioning SRS port may be an SRS port of an SRS resource of an SRS resource set defined in the SRS configuration received from the cell. At block 1035, the cell may receive the positioning SRS at a fourth time (e.g., $T_{gNB,Rx}=T_4$).

It should be noted that the UE may receive a plurality of downlink PRS from a plurality of cells/TRPs and may subsequently transmit a plurality of positioning SRS in response. In this way, a plurality of RTTs may be measured to enable the position of the UE to be determined.

At block 1040, the UE may send a UE delay parameter (e.g., $T_{UE,Rx \to Tx}=T_3-T_2$) to the cell. As described above, this is the time duration from the earliest TOA (e.g., earliest $T_{UE,Rx}=T_2$) of the downlink PRS from the cell and the transmission time (e.g., $T_{UE,Tx}=T_3$) of the positioning SRS from the UE. At block 1045, the cell may receive the UE delay parameter. It should be noted that the positioning SRS and the corresponding UE delay parameter may be transmitted contemporaneously or may be separately transmitted. At block 1055, the cell may calculate the RTT, or may forward the information to a positioning entity (e.g., location server 230, LMF 270).

In an aspect, there may be constraints on the time behavior of positioning SRS. For example, if a positioning SRS is an SRS resource used for positioning purposes and for another purpose, such as communication (e.g., tagged as CB and positioning, NCB and positioning, AntSw and positioning, and/or ULBM and positioning), aperiodic SRS transmission (e.g., triggered by DCI) and/or semi-persistent SRS transmission (e.g., triggered by MAC CE) may not be allowed.

Also, if a positioning SRS is an SRS resource that is used for different purposes in different SRS resource sets, and the different purposes collide, then a priority may be given depending on the tagging. For example, one priority may be as follows: SRS for communication and positioning purposes may have a higher priority than an SRS for communication purposes only, which may have a higher priority than an SRS for positioning purposes only. That is, if an SRS resource is used for communication and positioning purposes in a first SRS resource set and the same SRS resource is used for communication purposes only in a second SRS resource, then when the SRS collide on the same symbol, then the SRS used for both communication and positioning purposes may take precedence. Between the SRS used for communication purposes only and the SRS used for positioning purposes only, the SRS used for communication purposes only may take precedence.

In an aspect, a sequence (e.g., a Zadoff-Chu sequence) used for a positioning SRS, i.e., a sequence of an SRS resource used for positioning purposes, regardless of whether or not it is also used for communication purposes, may be different from a sequence of an SRS resource used for communication purposes only. For example, the sequence initialization of the positioning SRS may depend on (i.e., be based on) a different sequence initialization number than the one used for an SRS resource used for communication purposes only. As another example, the sequence used for a positioning SRS resource may be based on a pi/2-BPSK (binary phase shift keying) rather than Zadoff-Chu based.

As described above, conventional SRS resources can occupy only the last six symbols of a slot. However, in an aspect, a positioning SRS may span more than the last six symbols. For example, it may span any number of symbols in a slot including all of them (e.g., 14 for 15 kHz numerology). Also, a comb offset may change in every symbol slot in, for example, a round robin manner. That is, the comb offset may change in each symbol of the SRS resource and then repeat (e.g., 1, 2, 3, 1, 2, 3, etc.). Further, the positioning SRS may appear before a PUSCH in a slot.

In an aspect, a positioning SRS may be configured for positioning and for another purpose. For example, a positioning SRS may be an SRS resource used for communication purposes in a first SRS resource set and used for positioning purposes in a second SRS resource set. In an aspect, the positioning SRS may be transmitted using transmit (Tx) power and power control parameters that follow a power control loop of the first SRS resource set.

On the other hand, if a positioning SRS is used for positioning purposes only, then it may have independent Tx power and power control parameters. In one option, only open loop power control may be supported. In another option, only closed loop power control may be supported. In yet another option, both may be supported. In yet another option, the UE may transmit positioning SRS at a fixed power (e.g., maximum power). In an aspect, the UE may report its power capabilities to the cell.

Note that in open loop power control, there is no feedback either from the UE to the cell or from the cell to the UE. A UE receives a pilot channel from the cell and estimates the signal strength. Based on this estimate, the UE adjusts its transmit power accordingly. During this open loop control, it is assumed that both downlink and uplink are correlated. In closed loop power control, feedback from the receiver is used by the transmitter for adjusting the transmit power level.

Even if the UE is capable of responding to power control command updates, it may not respond to such commands during transmission of positioning SRS. That is, for a threshold period of time from the start of transmission of a positioning SRS, the UE may not respond to any power control commands from the cell. The threshold period of time may represent a time duration in which the cells of the network are in the listening phase of an RTT procedure. The threshold period may be a number of slots, a number of slots within a frame, a number of frames, etc.

Figure 11:
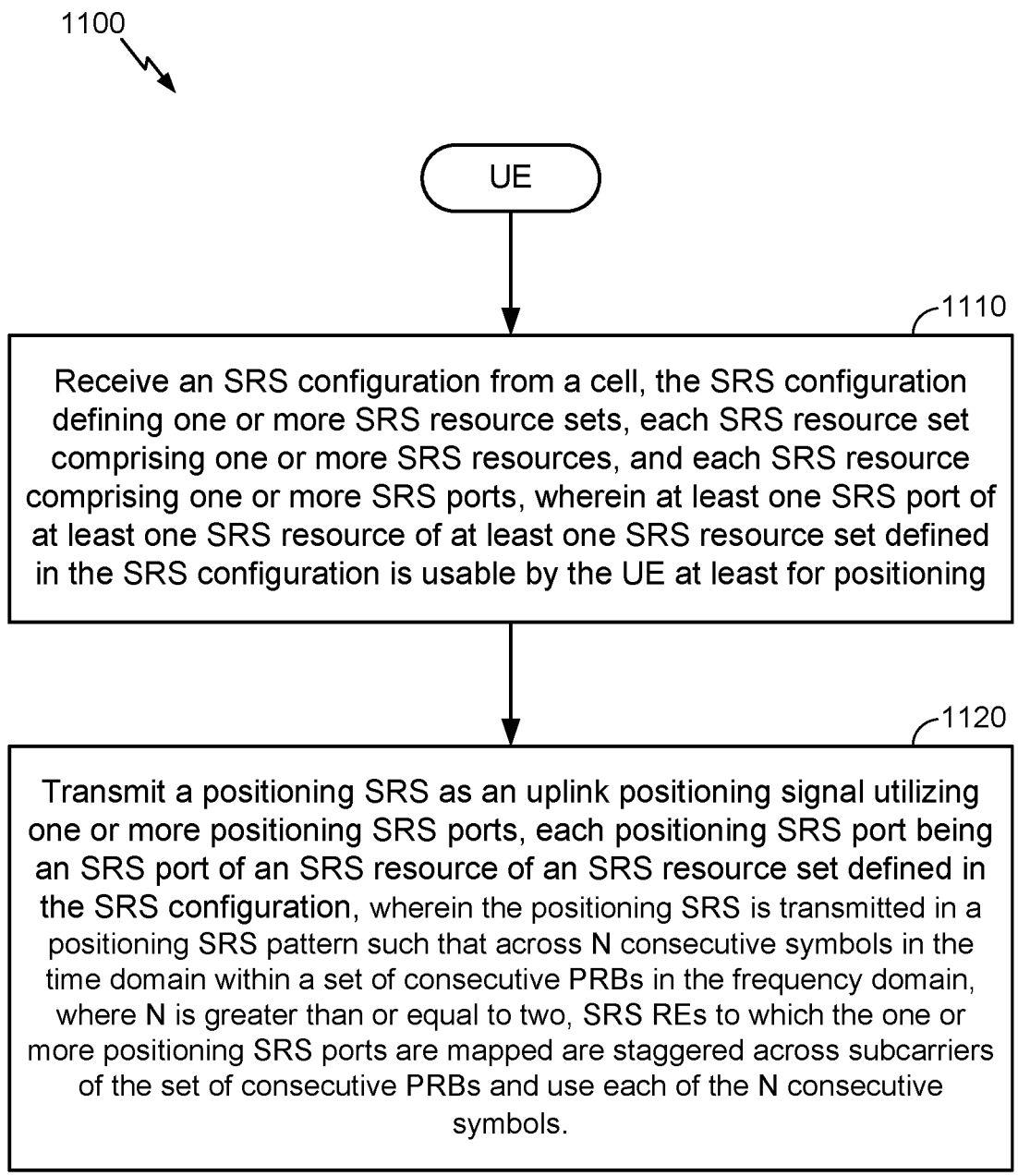
FIGS. 11 and 12 illustrate exemplary methods according to one or more aspects of the disclosure.

FIG. 11 illustrates an exemplary method 1100, according to one or more aspects of the disclosure. In an aspect, the method 1100 may be performed by a UE (e.g., any of the UEs described herein).

At 1110, the UE receives an SRS configuration from a cell (e.g., a cell/TRP of any of the base stations described herein), the SRS configuration defining one or more SRS resource sets, each SRS resource set comprising one or more SRS resources, and each SRS resource comprising one or more SRS ports. In an aspect, at least one SRS port of at least one SRS resource of at least one SRS resource set defined in the SRS configuration is usable by the UE at least for positioning. In an aspect, operation 1110 may be performed by receiver(s) 312, WWAN transceiver 310, processing system 332, memory 340, and/or RTT measurement component 342.

At 1120, the UE transmits a positioning SRS as an uplink positioning signal utilizing one or more positioning SRS ports, each positioning SRS port being an SRS port of an SRS resource of an SRS resource set defined in the SRS configuration. In an aspect, the positioning SRS is transmitted in a positioning SRS pattern such that across N consecutive symbols, where N is greater than or equal to two, SRS REs to which the one or more positioning SRS ports are mapped are staggered in frequency and use each of the N consecutive symbols. In an aspect, operation 1120 may be performed by transmitter(s) 314, WWAN transceiver 310, processing system 332, memory 340, and/or RTT measurement component 342.

Figure 12:
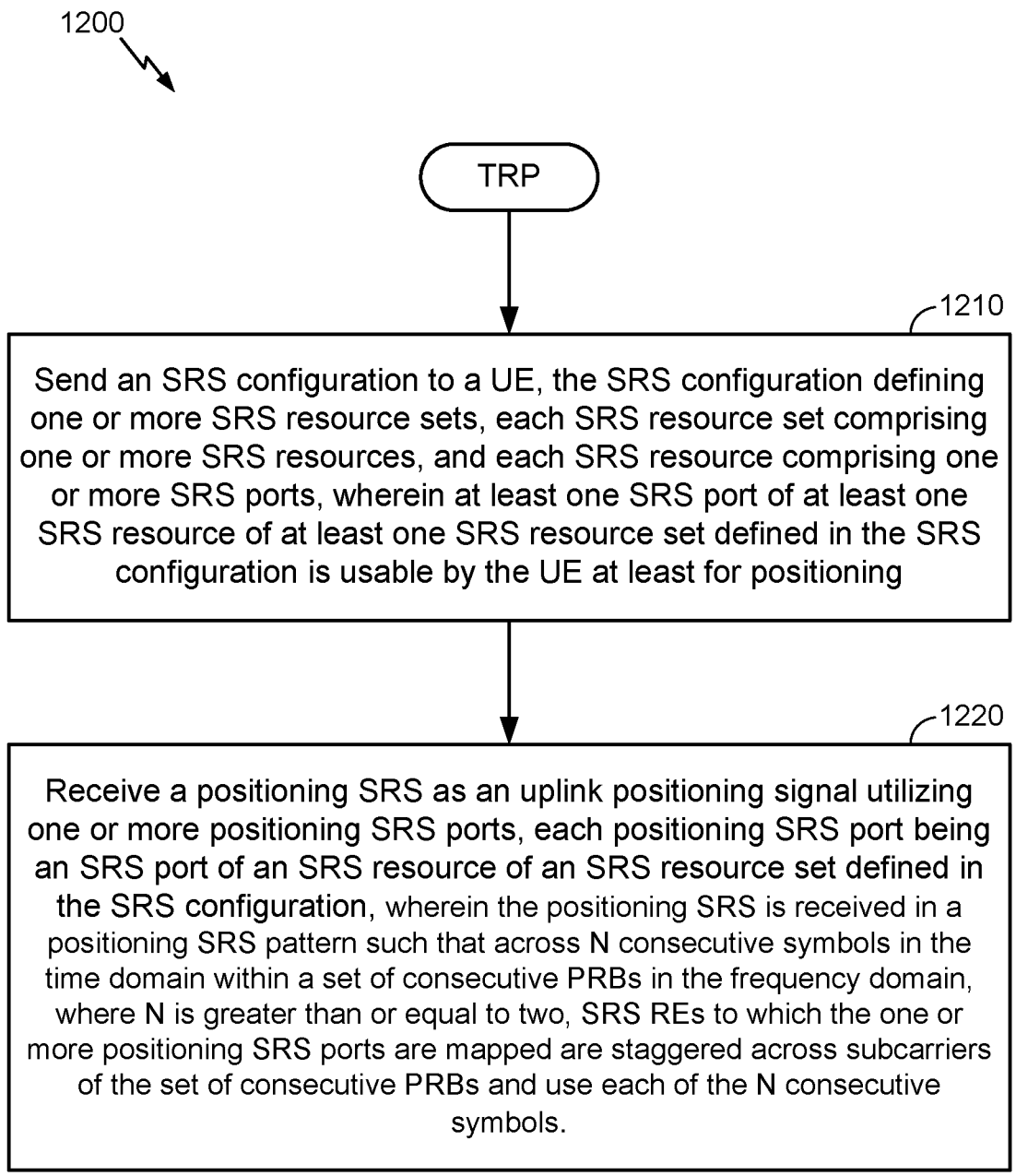

FIG. 12 illustrates an exemplary method 1200, according to one or more aspects of the disclosure. In an aspect, the method 1200 may be performed by a cell/TRP of a base station (e.g., any of the base stations described herein).

At 1210, the cell sends an SRS configuration to a UE (e.g., any of the UEs described herein), the SRS configuration defining one or more SRS resource sets, each SRS resource set comprising one or more SRS resources, and each SRS resource comprising one or more SRS ports. In an aspect, at least one SRS port of at least one SRS resource of at least one SRS resource set defined in the SRS configuration is usable by the UE at least for positioning. In an aspect, operation 1210 may be performed by transmitter(s) 354, WWAN transceiver 350, processing system 384, memory 386, and/or RTT measurement component 388.

At 1220, the cell receives a positioning SRS as an uplink positioning signal utilizing one or more positioning SRS ports, each positioning SRS port being an SRS port of an SRS resource of an SRS resource set defined in the SRS configuration. In an aspect, the positioning SRS is received in a positioning SRS pattern such that across N consecutive symbols, where N is greater than or equal to two, SRS resource elements (REs) to which the one or more positioning SRS ports are mapped are staggered in frequency and use each of the N consecutive symbols. In an aspect, operation 1220 may be performed by receiver(s) 352, WWAN transceiver 350, processing system 384, memory 386, and/or RTT measurement component 388.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
   a memory;
   at least one processor; and
   at least one transceiver, wherein the at least one transceiver is configured to:
   receive a sounding reference signal (SRS) configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and
   transmit a positioning SRS as an uplink positioning signal utilizing one or more positioning SRS ports, each positioning SRS port being an SRS port of an SRS resource of an SRS resource set defined in the SRS configuration,
   wherein the positioning SRS is transmitted in a positioning SRS pattern such that across N consecutive symbols, where N is greater than or equal to two, SRS resource elements (REs) to which the one or more positioning SRS ports are mapped are staggered in frequency and use each of the N consecutive symbols.

2. The UE of claim 1, wherein the SRS REs are such that across N consecutive symbols over N consecutive subcarriers, each of the N consecutive symbols is used once and each of the N consecutive subcarriers is used once.

3. The UE of claim 1, wherein each of the one or more positioning SRS ports is a configured positioning SRS port or a designated positioning SRS port, the configured positioning SRS port being an SRS port configured to be used for positioning purposes in the SRS configuration, and the designated positioning SRS port being an SRS port designated to be used for positioning purposes by the UE.

4. The UE of claim 1, wherein the one or more SRS resource sets comprise at least one positioning SRS resource set that is an SRS resource set configured or designated to be used for positioning purposes at an SRS resource set level.

5. The UE of claim 4, wherein:
   all SRS resources of the at least one positioning SRS resource set are automatically positioning SRS resources, and
   all SRS ports of all SRS resources of the at least one positioning SRS resource set are automatically positioning SRS ports.

6. The UE of claim 4, wherein the at least one positioning SRS resource set is a configured positioning SRS resource set or a designated positioning SRS resource set, the configured positioning SRS resource set being an SRS resource set configured to be used for positioning purposes in the SRS configuration, and the designated positioning SRS resource set being an SRS resource set designated to be used for positioning purposes by the UE.

7. The UE of claim 4, wherein:
   the one or more SRS resource sets comprise at least one non-positioning SRS resource set that is an SRS resource set not configured and not designated to be used for positioning purposes at the SRS resource set level, and
   the at least one non-positioning SRS resource set comprises at least one positioning SRS resource that is an SRS resource configured or designated to be used for positioning purposes at an SRS resource level.

8. The UE of claim 7, wherein all SRS ports of the at least one positioning SRS resource are automatically positioning SRS ports.

9. The UE of claim 7, wherein the at least one positioning SRS resource is a configured positioning SRS resource or a designated positioning SRS resource, the configured positioning SRS resource being an SRS resource configured to be used for positioning purposes in the SRS configuration, and the designated positioning SRS resource being an SRS resource designated to be used for positioning purposes by the UE.

10. The UE of claim 7, wherein:
the at least one non-positioning SRS resource set comprises at least one non-positioning SRS resource that is an SRS resource not configured and not designated to be used for positioning purposes at the SRS resource level, and
the at least one non-positioning SRS resource comprises at least one positioning SRS port that is an SRS port configured or designated to be used for positioning purposes at an SRS port level.

11. The UE of claim 10, wherein the at least one positioning SRS port is a configured positioning SRS port or a designated positioning SRS port, the configured positioning SRS port being an SRS port configured to be used for positioning purposes in the SRS configuration, and the designated positioning SRS port being an SRS port designated to be used for positioning purposes by the UE.

12. The UE of claim 1, wherein:
at least one of the one or more SRS resource sets comprises a positioning SRS resource spanning N consecutive symbols, and
a positioning SRS port of the positioning SRS resource is mapped to SRS REs of the N consecutive symbols such that all N comb offsets are used.

13. The UE of claim 12, wherein the positioning SRS port of the positioning SRS resource is mapped to the SRS REs of the N consecutive symbols over N consecutive subcarriers such that each of N comb offsets is used once and each of the N consecutive subcarriers is used once.

14. The UE of claim 1, wherein:
at least one of the one or more SRS resource sets comprises N consecutive positioning SRS resources, each positioning SRS resource being M symbols in duration, where M is greater than or equal to 1, such that the N consecutive positioning SRS resources correspond to N*M consecutive symbols, and
a positioning SRS port of each positioning SRS resource is mapped to SRS REs in the M symbols such that across the N consecutive positioning SRS resources, the mapped SRS REs are staggered in frequency, and within the M symbols of each positioning SRS resource, the SRS REs are not staggered in frequency.

15. The UE of claim 14, wherein the one or more positioning SRS ports of the uplink positioning signal are mapped to the SRS REs across the N consecutive positioning SRS resources over N consecutive subcarriers such that each of the N consecutive symbols is used once and each of the N consecutive subcarriers is used once.

16. The UE of claim 14, wherein the UE is configured with a same port across the N consecutive positioning SRS resources.

17. The UE of claim 16, wherein the N consecutive positioning SRS resources are transmitted in a same slot.

18. The UE of claim 14, wherein a same port index of the N consecutive positioning SRS resources are quasi-collocated across the N consecutive positioning SRS resources.

19. The UE of claim 1, wherein no aperiodic SRS transmission is allowed for the positioning SRS if the positioning SRS is an SRS resource used for positioning purposes and for communication purposes.

20. The UE of claim 1, wherein no semi-persistent SRS is allowed for the positioning SRS if the positioning SRS is an SRS resource used for positioning purposes and for communication purposes.

21. The UE of claim 1, wherein when the positioning SRS is an SRS resource used for both communication and positioning purposes in a first SRS resource set and used for communication purposes only in a second SRS resource set, and when the SRS collides on a same symbol, the SRS used for both communication and positioning purposes is prioritized over the SRS used for communication purposes only.

22. The UE of claim 1, wherein, when the positioning SRS is an SRS resource used for both communication and positioning purposes in a first SRS resource set and used for positioning purposes only in a second SRS resource set, and when the SRS collides on a same symbol, the SRS used for both communication and positioning purposes is prioritized over the SRS used for positioning purposes only.

23. The UE of claim 1, wherein, when the positioning SRS is an SRS resource used for communication purposes only in a first SRS resource set and used for positioning purposes only in a second SRS resource set, and when the SRS collides on a same symbol, the SRS used for communication purposes only is prioritized over the SRS used for positioning purposes only.

24. The UE of claim 1, wherein a sequence used for transmission of an SRS resource used for positioning purposes differs from a sequence used for transmission of an SRS resource used for communication purposes only.

25. The UE of claim 24, wherein the sequence used for transmission of the SRS resource used for positioning purposes is pi/2-BPSK (binary phase shift keying) based.

26. The UE of claim 24, wherein an initialization of the sequence used for transmission of the SRS resource used for positioning purposes is based on a different sequence initialization number than an initialization of the sequence used for transmission of the SRS resource used for communication purposes only.

27. The UE of claim 1, wherein an SRS resource used for positioning purposes spans more than a last six symbols of a slot.

28. The UE of claim 27, wherein the SRS resource used for positioning purposes spans all symbols of the slot.

29. The UE of claim 28, wherein the SRS resource used for positioning purposes is repeated to all symbols of the slot.

30. The UE of claim 1, wherein a comb offset changes in every symbol of a slot in a round robin manner.

31. The UE of claim 1, wherein an SRS resource used for positioning purposes appears before a physical uplink shared channel (PUSCH) in a slot.

32. The UE of claim 1, wherein, when the positioning SRS is an SRS resource used for communication purposes in a first SRS resource set and used for positioning purposes in a second SRS resource set, the positioning SRS is transmitted using a transmit (Tx) power and power control parameters that follow a power control loop of the first SRS resource set.

33. The UE of claim 1, wherein, when the positioning SRS is an SRS resource used for positioning purposes only, the UE supports open loop power control and does not support closed loop power control.

34. The UE of claim 1, wherein, when the positioning SRS is an SRS resource used for positioning purposes, the UE does not respond to any power control commands from the cell received within a threshold period of time from a start of transmission of the positioning SRS.

35. The UE of claim 34, wherein the threshold period of time is a number of slots.

36. The UE of claim 34, wherein the threshold period of time is a number of slots of a frame.

37. The UE of claim 34, wherein the threshold period of time is a number of frames.

38. A base station, comprising:
a memory;
at least one processor; and
at least one transceiver, wherein the at least one transceiver is configured to:
send a sounding reference signal (SRS) configuration to a user equipment (UE), the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and
receive a positioning SRS as an uplink positioning signal utilizing one or more positioning SRS ports, each positioning SRS port being an SRS port of an SRS resource of an SRS resource set defined in the SRS configuration,
wherein the positioning SRS is received in a positioning SRS pattern such that across N consecutive symbols, where N is greater than or equal to two, SRS resource elements (REs) to which the one or more positioning SRS ports are mapped are staggered in frequency and use each of the N consecutive symbols.

39. The base station of claim 38, wherein the SRS REs are such that across N consecutive symbols over N consecutive subcarriers, each of the N consecutive symbols is used once and each of the N consecutive subcarriers is used once.

40. The base station of claim 38, wherein each of the one or more positioning SRS ports is a configured positioning SRS port or a designated positioning SRS port, the configured positioning SRS port being an SRS port configured to be used for positioning purposes in the SRS configuration, and the designated positioning SRS port being an SRS port designated to be used for positioning purposes by the UE.

41. The base station of claim 38, wherein the one or more SRS resource sets comprise at least one positioning SRS resource set that is an SRS resource set configured or designated to be used for positioning purposes at an SRS resource set level.

42. The base station of claim 41, wherein:
all SRS resources of the at least one positioning SRS resource set are automatically positioning SRS resources, and
all SRS ports of all SRS resources of the at least one positioning SRS resource set are automatically positioning SRS ports.

43. The base station of claim 41, wherein the at least one positioning SRS resource set is a configured positioning SRS resource set or a designated positioning SRS resource set, the configured positioning SRS resource set being an SRS resource set configured to be used for positioning purposes in the SRS configuration, and the designated positioning SRS resource set being an SRS resource set designated to be used for positioning purposes by the UE.

44. The base station of claim 41, wherein:
the one or more SRS resource sets comprise at least one non-positioning SRS resource set that is an SRS resource set not configured and not designated to be used for positioning purposes at the SRS resource set level, and
the at least one non-positioning SRS resource set comprises at least one SRS resource that is an SRS resource configured or designated to be used for positioning purposes at an SRS resource level.

45. The base station of claim 44, wherein all SRS ports of the at least one positioning SRS resource are automatically positioning SRS ports.

46. The base station of claim 44, wherein the at least one positioning SRS resource is a configured positioning SRS resource or a designated positioning SRS resource, the configured positioning SRS resource being an SRS resource configured to be used for positioning purposes in the SRS configuration, and the designated positioning SRS resource being an SRS resource designated to be used for positioning purposes by the UE.

47. The base station of claim 44, wherein:
the at least one non-positioning SRS resource set comprises at least one non-positioning SRS resource that is an SRS resource not configured and not designated to be used for positioning purposes at the SRS resource level, and
the at least one non-positioning SRS resource comprises at least one positioning SRS port that is an SRS port configured or designated to be used for positioning purposes at an SRS port level.

48. The base station of claim 47, wherein the at least one positioning SRS port is a configured positioning SRS port or a designated positioning SRS port, the configured positioning SRS port being an SRS port configured to be used for positioning purposes in the SRS configuration, and the designated positioning SRS port being an SRS port designated to be used for positioning purposes by the UE.

49. The base station of claim 38, wherein:
at least one of the one or more SRS resource sets comprises a positioning SRS resource spanning N consecutive symbols, and
a positioning SRS port of the positioning SRS resource is mapped to SRS REs of the N consecutive symbols such that all N comb offsets are used.

50. The base station of claim 49, wherein the positioning SRS port of the positioning SRS resource is mapped to the SRS REs of the N consecutive symbols over N consecutive subcarriers such that each of N comb offsets is used once and each of the N consecutive subcarriers is used once.

51. The base station of claim 38, wherein:
at least one of the one or more SRS resource sets comprises N consecutive positioning SRS resources, each positioning SRS resource being M symbols in duration, where M is greater than or equal to 1, such that the N consecutive positioning SRS resources correspond to N*M consecutive symbols, and
a positioning SRS port of each positioning SRS resource is mapped to SRS REs in the M symbols such that across the N consecutive positioning SRS resources, the mapped SRS REs are staggered in frequency, and within the M symbols of each positioning SRS resource, the SRS REs are not staggered in frequency.

52. The base station of claim 51, wherein the one or more positioning SRS ports of the uplink positioning signal are mapped to the SRS REs across the N consecutive positioning SRS resources over N consecutive subcarriers such that each of the N consecutive symbols is used once and each of the N consecutive subcarriers is used once.

53. The base station of claim 51, wherein the UE is configured with a same port across the N consecutive positioning SRS resources.

54. The base station of claim 53, wherein the N consecutive positioning SRS resources are transmitted in a same slot.

55. The base station of claim 51, wherein a same port index of the N consecutive positioning SRS resources are quasi-collocated across the N consecutive positioning SRS resources.

56. The base station of claim 38, wherein no aperiodic SRS transmission is allowed for the positioning SRS if the positioning SRS is an SRS resource used for positioning purposes and for communication purposes.

57. The base station of claim 38, wherein no semi-persistent SRS is allowed for the positioning SRS if the positioning SRS is an SRS resource used for positioning purposes and for communication purposes.

58. The base station of claim 38, wherein when the positioning SRS is an SRS resource used for both communication and positioning purposes in a first SRS resource set and used for communication purposes only in a second SRS resource set, and when the SRS collides on a same symbol, the SRS used for both communication and positioning purposes is prioritized over the SRS used for communication purposes only.

59. The base station of claim 38, wherein, when the positioning SRS is an SRS resource used for both communication and positioning purposes in a first SRS resource set and used for positioning purposes only in a second SRS resource set, and when the SRS collides on a same symbol, the SRS used for both communication and positioning purposes is prioritized over the SRS used for positioning purposes only.

60. The base station of claim 38, wherein, when the positioning SRS is an SRS resource used for communication purposes only in a first SRS resource set and used for positioning purposes only in a second SRS resource set, and when the SRS collides on a same symbol, the SRS used for communication purposes only is prioritized over the SRS used for positioning purposes only.

61. The base station of claim 38, wherein a sequence used for transmission of an SRS resource used for positioning purposes differs from a sequence used for transmission of an SRS resource used for communication purposes only.

62. The base station of claim 61, wherein the sequence used for transmission of the SRS resource used for positioning purposes is pi/2-BPSK (binary phase shift keying) based.

63. The base station of claim 61, wherein an initialization of the sequence used for transmission of the SRS resource used for positioning purposes is based on a different sequence initialization number than an initialization of the sequence used for transmission of the SRS resource used for communication purposes only.

64. The base station of claim 38, wherein an SRS resource used for positioning purposes spans more than a last six symbols of a slot.

65. The base station of claim 64, wherein the SRS resource used for positioning purposes spans all symbols of the slot.

66. The base station of claim 65, wherein the SRS resource used for positioning purposes is repeated to all symbols of the slot.

67. The base station of claim 38, wherein a comb offset changes in every symbol of a slot in a round robin manner.

68. The base station of claim 38, wherein an SRS resource used for positioning purposes appears before a physical uplink shared channel (PUSCH) in a slot.

69. The base station of claim 38, wherein, when the positioning SRS is an SRS resource used for communication purposes in a first SRS resource set and used for positioning purposes in a second SRS resource set, the positioning SRS is transmitted using a transmit (Tx) power and power control parameters that follow a power control loop of the first SRS resource set.

70. The base station of claim 38, wherein, when the positioning SRS is an SRS resource used for positioning purposes only, the UE supports open loop power control and does not support closed loop power control.

71. The base station of claim 38, wherein, when the positioning SRS is an SRS resource used for positioning purposes, the UE does not respond to any power control commands from the base station received within a threshold period of time from a start of transmission of the positioning SRS.

72. The base station of claim 71, wherein the threshold period of time is a number of slots.

73. The base station of claim 71, wherein the threshold period of time is a number of slots of a frame.

74. The base station of claim 71, wherein the threshold period of time is a number of frames.

75. A method performed by a user equipment (UE), comprising:
receiving a sounding reference signal (SRS) configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and
transmitting a positioning SRS as an uplink positioning signal utilizing one or more positioning SRS ports, each positioning SRS port being an SRS port of an SRS resource of an SRS resource set defined in the SRS configuration,
wherein the positioning SRS is transmitted in a positioning SRS pattern such that across N consecutive symbols, where N is greater than or equal to two, SRS resource elements (REs) to which the one or more positioning SRS ports are mapped are staggered in frequency and use each of the N consecutive symbols.

76. A method performed by a cell of a base station, the method comprising:
sending a sounding reference signal (SRS) configuration to a user equipment (UE), the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and
receiving a positioning SRS as an uplink positioning signal utilizing one or more positioning SRS ports, each positioning SRS port being an SRS port of an SRS resource of an SRS resource set defined in the SRS configuration,
wherein the positioning SRS is received in a positioning SRS pattern such that across N consecutive symbols, where N is greater than or equal to two, SRS resource elements (REs) to which the one or more positioning SRS ports are mapped are staggered in frequency and use each of the N consecutive symbols.

77. A user equipment (UE), comprising:
means for receiving a sounding reference signal (SRS) configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and means for transmitting a positioning SRS as an uplink positioning signal utilizing one or more positioning SRS ports, each positioning SRS port being an SRS port of an SRS resource of an SRS resource set defined in the SRS configuration, wherein the positioning SRS is transmitted in a positioning SRS pattern such that across N consecutive symbols, where N is greater than or equal to two, SRS resource elements (REs) to which the one or more positioning SRS ports are mapped are staggered in frequency and use each of the N consecutive symbols.

78. A base station, comprising:

means for sending a sounding reference signal (SRS) configuration to a user equipment (UE), the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and means for receiving a positioning SRS as an uplink positioning signal utilizing one or more positioning SRS ports, each positioning SRS port being an SRS port of an SRS resource of an SRS resource set defined in the SRS configuration, wherein the positioning SRS is received in a positioning SRS pattern such that across N consecutive symbols, where N is greater than or equal to two, SRS resource elements (REs) to which the one or more positioning SRS ports are mapped are staggered in frequency and use each of the N consecutive symbols.

79. A non-transitory computer-readable medium storing computer-executable instructions, the computer-executable instructions comprising:

one or more instructions instructing a user equipment (UE) to receive a sounding reference signal (SRS) configuration from a cell, the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and one or more instructions instructing the UE to transmit a positioning SRS as an uplink positioning signal utilizing one or more positioning SRS ports, each positioning SRS port being an SRS port of an SRS resource of an SRS resource set defined in the SRS configuration, wherein the positioning SRS is transmitted in a positioning SRS pattern such that across N consecutive symbols, where N is greater than or equal to two, SRS resource elements (REs) to which the one or more positioning SRS ports are mapped are staggered in frequency and use each of the N consecutive symbols.

80. A non-transitory computer-readable medium storing computer-executable instructions, the computer-executable instructions comprising:

one or more instructions instructing a base station to send a sounding reference signal (SRS) configuration to a user equipment (UE), the SRS configuration defining one or more SRS resource sets, each SRS resource set comprising one or more SRS resources, and each SRS resource comprising one or more SRS ports, wherein at least one SRS port of at least one SRS resource of at least one SRS resource set defined in the SRS configuration is usable by the UE at least for positioning; and one or more instructions instructing the base station to receive a positioning SRS as an uplink positioning signal utilizing one or more positioning SRS ports, each positioning SRS port being an SRS port of an SRS resource of an SRS resource set defined in the SRS configuration, wherein the positioning SRS is received in a positioning SRS pattern such that across N consecutive symbols, where N is greater than or equal to two, SRS resource elements (REs) to which the one or more positioning SRS ports are mapped are staggered in frequency and use each of the N consecutive symbols.

* * * * *